(12) United States Patent
Edwards

(10) Patent No.: US 9,732,735 B2
(45) Date of Patent: Aug. 15, 2017

(54) APPARATUS, SYSTEM, AND METHOD FOR RAISING WATER USING A CONTAINER WITH MEMBRANE

(71) Applicant: Douglas Edwards, Sussex (GB)

(72) Inventor: Douglas Edwards, Sussex (GB)

(73) Assignee: RE SYSTEMS LTD. (GB)

( * ) Notice: Subject to any disclaimer, the term of this patent is extended or adjusted under 35 U.S.C. 154(b) by 260 days.

(21) Appl. No.: 14/397,046

(22) PCT Filed: Apr. 19, 2013

(86) PCT No.: PCT/GB2013/000171
§ 371 (c)(1),
(2) Date: Oct. 24, 2014

(87) PCT Pub. No.: WO2013/164555
PCT Pub. Date: Nov. 7, 2013

(65) Prior Publication Data
US 2015/0075657 A1 Mar. 19, 2015

(30) Foreign Application Priority Data

Apr. 30, 2012 (GB) .................................. 1207517.2
Jun. 25, 2012 (GB) .................................. 1211230.6

(51) Int. Cl.
*F03G 7/04* (2006.01)
*F03G 7/05* (2006.01)
*F03B 13/18* (2006.01)

(52) U.S. Cl.
CPC .............. *F03G 7/05* (2013.01); *F03B 13/183* (2013.01); *F03B 13/187* (2013.01); *F05B 2210/11* (2013.01); *F05B 2220/62* (2013.01); *Y02E 10/34* (2013.01); *Y02E 10/38* (2013.01); *Y10T 137/87917* (2015.04)

(58) Field of Classification Search
CPC ........... F04B 19/22; F04B 19/24; F04B 19/20
See application file for complete search history.

(56) References Cited

U.S. PATENT DOCUMENTS

| 1,406,036 A | 2/1922 | Lake |
| 1,413,930 A | 4/1922 | Orr et al. |
| 1,764,539 A | 6/1930 | Stinson |

(Continued)

FOREIGN PATENT DOCUMENTS

| DE | 2901856 | 7/1980 | .............. F03B 13/18 |
| DE | 202008007235 U1 | 9/2008 | |

(Continued)

*Primary Examiner* — Jesse Bogue
(74) *Attorney, Agent, or Firm* — Hayes Soloway PC

(57) ABSTRACT

An apparatus, system, and method for raising water is provided. The apparatus includes at least one container movable between at least a descended position and a ascended position within a body of water. A non-water-permeable membrane is positioned within the at least one container, wherein the membrane is movable within an interior compartment of the at least one container to separate the interior compartment into at least a first and a second portion. At least one vent structure is within a wall of the at least one container, wherein movement of the membrane controls a flow of water through the at least one vent structure and into at least one of the first and second portions.

15 Claims, 8 Drawing Sheets

(56) References Cited

U.S. PATENT DOCUMENTS

| | | | |
|---|---|---|---|
| 1,868,219 A | 7/1932 | Parker | |
| 3,896,622 A * | 7/1975 | Daniello | F03G 7/05 60/641.7 |
| 3,902,825 A * | 9/1975 | Quillen | A01G 25/06 405/37 |
| 4,281,514 A | 8/1981 | Egerer | 60/641 R |
| 4,363,570 A | 12/1982 | van der Pot | 405/303 |
| 4,456,119 A | 6/1984 | in't Hout et al. | |
| 4,469,472 A * | 9/1984 | Newby | F04B 17/00 417/279 |
| 5,408,889 A | 4/1995 | Parault | |
| 8,117,843 B2 * | 2/2012 | Howard | F24J 3/06 60/641.6 |
| 9,181,932 B2 * | 11/2015 | Edwards | F03G 7/05 |
| 2004/0173035 A1 | 9/2004 | Britt | |
| 2005/0223483 A1 * | 10/2005 | English | A63B 69/0093 4/491 |
| 2009/0297371 A1 * | 12/2009 | Rei | F04B 19/24 417/379 |
| 2010/0092242 A1 | 4/2010 | Rasmussen | |
| 2010/0264658 A1 | 10/2010 | Torres Martinez | |
| 2011/0215650 A1 | 9/2011 | Slocum et al. | |
| 2015/0308401 A1 * | 10/2015 | Edwards | F03G 7/05 60/496 |

FOREIGN PATENT DOCUMENTS

| | | | |
|---|---|---|---|
| EP | 0002829 | 7/1979 | F03G 7/04 |
| EP | 1013953 A1 | 6/2000 | |
| GB | 1447758 | 9/1976 | |
| GB | 2324120 A | 10/1998 | |
| GB | 2383978 A | 7/2003 | |
| GB | 2390876 A | 1/2004 | |
| GB | 2473223 A | 3/2011 | |
| GB | 2489765 A | 10/2012 | |
| GB | 2489834 A | 10/2012 | |
| JP | S52156246 A | 12/1977 | |
| NL | 7907951 | 10/1979 | F03G 7/04 |
| WO | 8911036 A1 | 11/1989 | |
| WO | 2012136967 A2 | 10/2012 | |
| WO | 2013164555 A2 | 11/2013 | |

* cited by examiner

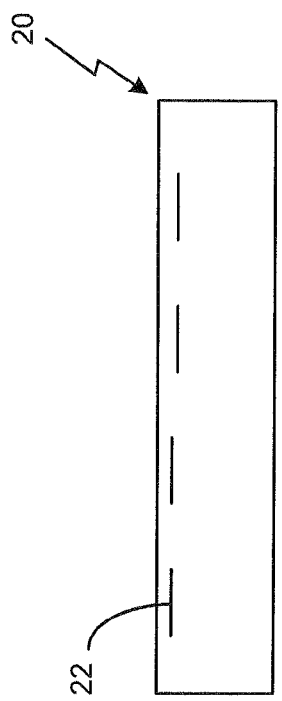
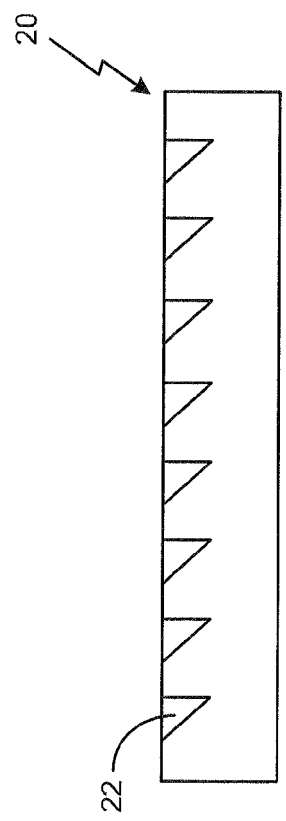

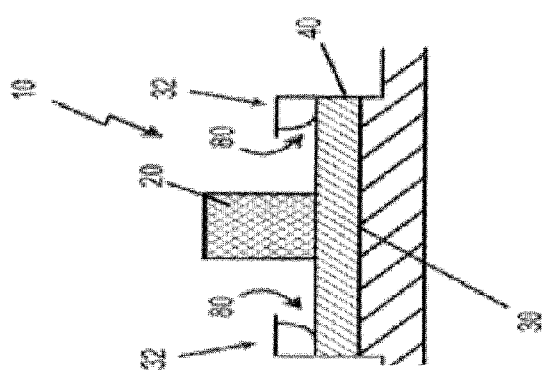
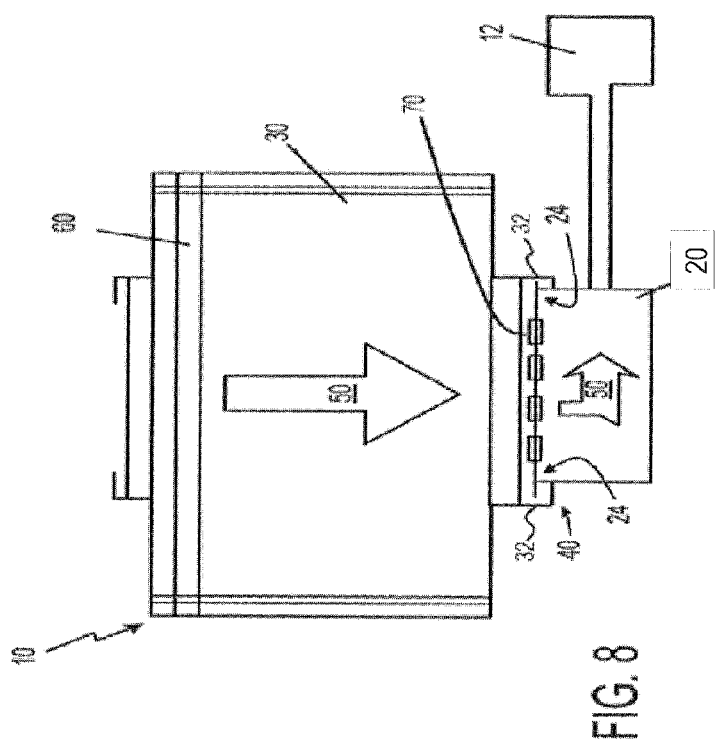

APPARATUS, SYSTEM, AND METHOD FOR RAISING WATER USING A CONTAINER WITH MEMBRANE

CROSS REFERENCE TO RELATED APPLICATION

This application claims benefit of International Application No. PCT/GB2013/000171 filed Apr. 19, 2013, which claims the benefits of GB Application No. 1207517.2 filed Apr. 30, 2012 and GB Application No. 1211230.6 filed Jun. 25, 2012, the entire disclosures of which are incorporated herein by reference.

FIELD OF THE DISCLOSURE

The present disclosure is generally related to raising water and more particularly is related an apparatus, system, and method for raising water using a container with membrane.

BACKGROUND OF THE DISCLOSURE

A low cost method raising water is required for commercial application. At present, ocean thermal energy conversion (OTEC) uses a cold water pipe to draw cold water from the deep sea, the pipe must either lie on the sea bed which is generally at least 5 miles from the land or it must be suspended. The OTEC pipe is so risky and expensive that OTEC is not commercially viable except in very ideal situations. OTEC uses the thermal difference between the warm tropical water and the cold sea water generally at least 1000 meters beneath the sea. The cold water is used in the condenser of a heat engine. The air conditioning industry also can utilize the cold water in the deep sea and it can also be used in mariculture and low temperature thermal desalination.

Thus the delivery of the cold water can be used in several different ways, and the way in which it is used and the proximity to the shore will determine the best method of importing the water. OTEC, low temperature desalination, and hydrogen production can be achieved at sea, or on land, the use of cold water in air conditioning requires for the water to be transported back to shore in most cases.

Thus, a heretofore unaddressed need exists in the industry to address the aforementioned deficiencies and inadequacies.

SUMMARY OF THE DISCLOSURE

Embodiments of the present disclosure provide a system and method for raising water. Briefly described, in architecture, one embodiment of the apparatus, among others, can be implemented as follows. At least one container is movable between at least a descended position and a ascended position within a body of water. A non-water-permeable membrane is positioned within the at least one container, wherein the membrane is movable within an interior compartment of the at least one container to separate the interior compartment into at least a first and a second portion. At least one valve is within a wall of the at least one container, wherein movement of the membrane controls a flow of water through the at least one valve and into at least one of the first and second portions.

The present disclosure can also be viewed as providing a system for continuous raising of water. Briefly described, in architecture, one embodiment of the system, among others, can be implemented as follows. At least one container is movable between at least a descended position and a ascended position within a body of water. A non-water-permeable membrane is positioned within the at least one container, wherein the membrane is movable within an interior compartment of the at least one container. At least one trough is proximate to a surface of the body of water. A seal is positioned between the at least one container and the at least one trough when the at least one container engages with the at least one trough, wherein the non-water-permeable membrane moves a quantity of water from the at least one container to the at least one trough when the at least one container engages with the at least one trough.

The present disclosure can also be viewed as providing a method of continuously rising water. In this regard, one embodiment of such a method, among others, can be broadly summarized by the following steps: providing at least one container movable between at least a descended position and a ascended position within a body of water; temporarily engaging the at least one container with at least one trough proximate to a surface of the body of water; sealing the temporary engagement a seal positioned between the at least one container and the at least one trough; and transferring a quantity of water from the at least one container to the at least one trough using a non-water-permeable membrane positioned within the at least one container, whereby the membrane is forced to move within an interior compartment of the at least one container thereby forcing the quantity of water into the at least one trough.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 7A-7B are a side views of a trough within a system for raising water, in accordance with the first exemplary embodiment of the present disclosure.

FIG. 8 is a side view of the system for raising water, in accordance with the first exemplary embodiment of the present disclosure.

FIG. 9 is an enlarged side view of the system for raising water, in accordance with the first exemplary embodiment of the present disclosure.

DETAILED DESCRIPTION

Figure 1:
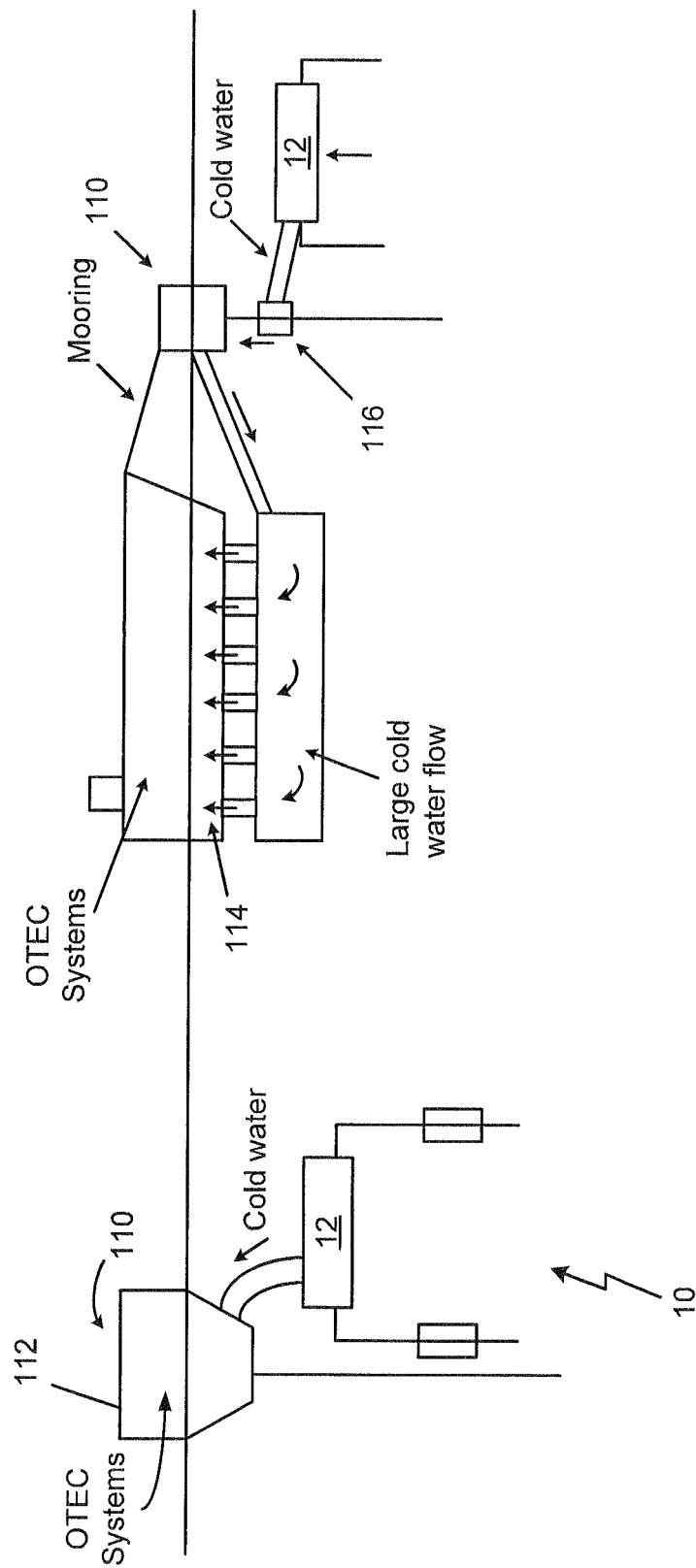
FIG. 1 is a schematic diagram of a single point mooring system for use with a system for raising water, in accordance with a first exemplary embodiment of the present disclosure.

Containers attached to cables can fill with cold water at the sea bottom and be pulled back to the surface along or driven by cables ideally motors would not be used to fill the containers, container can either be pulled or can use positive or negative buoyancy or water jets and travel along rails or cables which only act as a support. Containers are used to fill with water and travel along or are pulled by cables, pipes or rails.

Key Parts and Inventive Concepts, as Detailed within this Application, are Described:

A Semi Rigid Container Design;

the container is made from at least one of HDPE or PVC, EPDM geo membrane (non-permeable skin) with at least some pliancy/plasticity. The container would future latticed columns preferably plastic and heat welded, and would include any suitable roofing method including joists, girders, and purlins.

Poly ethylene rigid sheeting to create shape and rigidity preferably an additional frame, (rib system) made from fibre glass, HDPE or metal to provide support, structure and shape and strength. The inside of the container can be partitioned. The shape is similar to that of a wing/flying wing, with a curved nose. The container features movable membranes and valves; it can also feature a system to lower its weight in the water. Preferably the container is not taken out of the water to empty. The system must feature an extraction system and a method of taking in water. Preferably the waste cold water will be placed into the container as it is emptying of new cold water, with the use of an insulated partitioning membrane which can be a fabric cloth designed so that it moves up and down or side to side and that it sits flush against the side. This membrane can be weighted or buoyant with strips or weighted tube or buoyant tube, preferably the container will be able to pass in one direction around or along a supporting/guiding rope/beam system. Preferably the container will be able to empty as it is moving or will be able to come off the cables as the cable system continues to move/as per a modern ski lift system.

The use of HDPE is most likely to incorporate a movable membrane whereas the PCV would use the additional layer of fabric preferably PVC with at least one of EPDM, fibre glass and air.

A Container Design 2

A Flexible Container/'Bag'.

The skin is preferably made from PVC and rubber/EPDM the container is in the form of a bag the bag feature a middle section of fabric which is insulated by using two layer of PVC and fibre glass, or rubber this is so that the bag can hold two layers of water. Depending on where the bag is one or other sides of the bag will be full with the membrane pressed against the side. A person skilled in the trade of PVC bag production can advise on construction, preferably the bag will contain notches on the inside or outside to contain rigid members.

Preferably the container will then feature the most suitable of below mentioned features.

If this system uses the 'sliding filling emptying' see below the extraction insertion system will preferably pump in waste water and suck out fresh water so as to ensure that the middle layer is fully compressed.

Preferably some rigidity can be made using HDPE board, and additional insulation using EPDM.

Preferably the bags can rotate on a single axis and join to a rope from this axis in more than two places or through a single rigid section. The bags can feature hydraulic fins and rudders.

Container 3

Featuring a hard HDPE shell preferably with EPDM/rubber insulation, this container can be cylindrical or rectangular cuboid feature at least one moveable membrane. A weighted membrane can be held up with potential energy closing valves above it. At the sea bottom the container valve is released using a check valve and the membrane falls filling the container with sea water. The same can be true of a buoyant membrane.

The EDPM layer can be reinforced using small wires and can be used to hold pressurised air, and the walls of the container and the layer on the inside of the EDPM reinforced this pressurised air can be compressed with a piston at depth into a pressure vessel, the pressure vessel can release the air back into the EDPM layer on ascent, the use of a pressurised air will act as insulation and buoyancy and the air space 1 can feature fibre glass. Apart from the air pressure the container will use pistons or valves to neutralise internal and external pressures. Alternatively the EPDM layer can feature a layer of a least one of crude oil air, and interact with the surrounding pressures using pistons.

In order to create a Skelton, onto which the plastic is placed cables can be used for the lattice rather than bars, some 'columns' and rigid lattice can be used for rigidity.

The movable able membrane can comprise a double layer which is expansible filled with some air the membrane will compress with depth and expand at the surface, this create a tight seal rather than using air the membrane can be filled with a liquid and use a hydraulic pump.

In order for a fabric skin to have a slightly higher pressure than is outside, a bag can fill with a fluid to expand and create pressure as its combined volume along with the filled container will be large than the volume of the container.

A mixture of a rigid membrane with additional sheets of flexible plastic around the sides of the moving membrane, the flexible plastic is preferably joined to the middle of the bag and to the membrane sides. When the membrane is either up or down the sheets will then be flush against the sides.

Plastic Sheet/membrane can be given stability by welding additional sheets to create a latticed structure. Columns can be made by welding sheets of rigid plastic, the movable membrane can move along these columns. The 'roof'/floor can be supported by these columns and the columns can include a metal bar on the inside this can pass through a hole in the roof so that the roof and floor can be bolted to the columns. Additional plastic can also be heat welded to form beams, joists, purlins, girders and lattice work to join though heat welding or bolts to either the impermeable geomembrane or the rigid plastic sheet. Preferably these will also include a metal bar within the layers of plastic.

For a Two Way System;

This container can feature hoses which can forced down or up by the membrane or a it features metal inner section, in either case the container does not empty and fills and empties with a non-corrosive fluid, the inner pipe or the hoses can perform heat exchange as the container lies at the bottom. Pumps can drive fluid through the hoses check valves preferably separate the hoses from the outside water during ascent and for at least part of the decent. Additional pumps can suck the hoses shut, the check valves can be held on the inside of the container along with the pumps in a separate insulated region. The hoses can store buoyancy and be held on ropes so that they only ascend a particular distance these hoses will increase surface area.

Alternatively the container features a stirring system and a metal wall or thin plastic membrane rather than hoses, the container will stir its contents and cold water will be pumped through the layer between the metal wall and the outer shell so that heat exchange occurs.

One Way Continuous

A plurality of these container can travel in one direction, they can be pulled or travel along cables, the containers can be joined to one another by a very pliant/sealed, hinging section so that the operate in the same way as train carriage, indeed the entire system can be joined so that it has no nose or tail, this system would use the sliding filling insertion extraction system. The hinged section allows the containers to face in different directions.

A One way continuous system is a cable and container system where the containers move in one direction there are preferably more than two containers per cable (s). The container is able to from a seal with a 'trough' at or near the surface and can empty as it is moving. Alternatively the system removes a container from the cables empties and places them back on the cables using ski lift technology.

Two Ways;

Containers move up and down along the same route, like an elevator.

Detachable Two Way Containers;

Two containers on at least one cable

A container is removed from the cable at the surface (subsurface platform), whilst another is pulled down filled and brought back to the surface each container has enough water to last for the duration of the upward and downward journey of the other container.

Preferred Features

Doors

Preferably sliding doors which can use stored energy or a novel method which does not require stored energy.

The area of the door will be larger than the opening it covers in order to make a tight seal. The door itself can be lightweight neutral or even slightly buoyant.

Door wings can be drawn into rigid poles which open the doors; the doors can be weighted so when the container is not being dragged down the doors close and remain closed even if the container is not moving.

Sub Surface Platform

A surface container a submerged platform holds the cables and wheels and an extractor, the diving container is pulled into the extractor and the extractor is either fitted with pumps or the diving container drives the cold water out using the motorised membrane. The cold water is passed to shore or up to a boat or platform with the use of hoses alternatively the OTEC turbine can be stored on the platform either above the water on legs or below the water. The platform is either held from the bottom of a boat or platform, or works in the same way a tension leg wherein the platform is buoyant but tethered to the seabed so that it is suspended under the sea surface where the wave are much less powerful than at the surface. If the platform is like a tension leg and is joined to a ship it can detach from the ship so that the ship can either return to port or detach from the platform for safety.

Rather than using additional stored buoyancy the frame of the subsurface platform itself will be hollow and water tight thus it will be buoyant which will allow it to act as the buoyant support means.

Single Point Mooring System

FIG. 1 is a schematic diagram of a single point mooring system 110 for use with a system for raising water 10, in accordance with a first exemplary embodiment of the present disclosure. The submerged platform 12 is connected to a single point mooring system, a hose leads from one to the other, either at least one of the OTEC turbine 112 and heat exchange system, a hydrogen or water production system is incorporated into the SPM above or below the water surface. Other floating objects similar to SPM's can be connected to store one of a hydrogen or LTTD system, these SPM, s will preferably anchor to the same anchor line as the moored (sea bottom) SPM to save money. In this way SPM can be used to house small OTEC systems or a hydrogen or water production system.

Alternatively at least one hose will lead from the SPM to ship 114; a double hose will allow waste water to travel in the outer section, so that the water remains cold. The ship will hold any one of said components.

The SPM allows for OTEC or OTEC related activities to take place at the surface without the cost of a large platform, alternatively the SPM allows for water or electricity to pass to and from a ship, even in storms.

Submerged SPM (similar to SPM) are preferable to lower mooring and cable stress if ships are not used, each SPM can container a different part of the OTEC system i.e. one for OTEC one for desalination and another for hydrogen production. The moored SPM can join to a tanker to pass desalinated Water or Hydrogen to the ship.

Electricity can be exported down the SPM cable.

Large amounts of water can be passed to a ship using modified potable water bags preferably with two lays so that the waste cold water can pass back to the cable system.

Preferably Hoses will lead form the cables system to a swivel point 116 (i.e. a vertical pipe section held to a horizontal one with the horizontal pipe able to swivel on the vertical one, hoses will extend form one side and will lead to the form or side of the ship.

The cables system itself can be held from an SPM.

The SPM will allow the boat to swivel and for the delivery to remain in action.

SPM can send water to at least one ship.

Pipe Box;

An insulated container which holds pipes within it, this is so that the cold water can be sucked from it without extending warm pipes into the cold container. This is also intended to act as a support for the moving membrane and so that water can be sucked out of a container from its bottom even if the extractor is at the top, in the case of a container which has a moveable membrane this will be essential if the extractor is to be held above the diving container, which is the best location for the container as it would than not need to move out of the way of the diving container. The pipe within the container has inlets at one end when pressure is exerted on the membrane from above the cold water is forced through the pipe at the bottom of the container, as the membrane moves waste cold water, brine or sea water can be the fluid placed into the section whose volume is increasing. The cold water travels from the bottom of the container to the top. Either new cold water can either be sucked out with the membrane above it or the membrane can be at the bottom with waste cold water or brine being forced through the pipe to drive the membrane up rather than down.

The process can be done either way so that waste cold water is either forced into the top of the container or is forcing in the pipe.

Using containers for use in OTEC requires the use of large containers which might be very broad using a very broad movable membrane to force cold water in through one pipe within the system allows the membrane to drive fluid into a pipe with the relevant diameter and flow rate simply. The end of the pipe is fitted with a check valve which opens due to the force created by the membrane. The valve is forced to remain closed during the filling process at the sea bottom. Additional valves including fittings are placed at the top of the container through which at least one of brine waste cold water sea water is driven by the extractor pumps or main system pumps into the container, this addition of liquid is responsible for driving the membrane which in turn forces the cold water out. As a result one pump adds one fluid and pushes out the other in one synchronised process.

Vents in Container

Rather than using a pipe the container is fitted with at least one vent (with the side(s) of the container proper acting as 3 of the sides, preferably including check valves, these vents allow cold water to exit the container. in the same way as the pipe box.

Insertion Extraction System 1

The container is driven into the extractor, the extractor case is fitted over the pipe box, syringe container or bag using male to female fittings, small check valves allow the water which would compress or pollute the cold water between the male and female fitting to leave. The extractor case can be fitted with a collapsible tank on top with insulation. The location of the extractor could be to the side of the container or at the top, preferably at the top. A movable extractor can be placed underneath. A spring loaded catch on the extractor can lock into a groove on the container.

Hoses or pipes connected to the extractor case take the cold water to the OTEC, air conditioning or desalination system. Other hoses or pipes can be connected to place waste cold water or brine into the diving container. This system uses at least one cable system, preferably two, with two containers each, each system using a pair of ropes and with containers which do not come off the cables. This system really depends on at least two different cable systems working in tandem to create a regular flow of water to one heat engine/heat exchanger/condenser etc.

Insertion Extraction System 2

A Cable draws a container into the extractor case with male and female sockets, the container disconnects and then the cable then continues moving. The container is either held in place by clips or levers or it uses wings which are held between at least one pair of wheels.

Extraction System 3

Once gripped by the wheels a movable extractor is placed underneath the container, and the fluid within the container is drawn from top to bottom.

In the case of a two way system the containers are pulled up into an extractor are emptied and then descend, in the case of a one way system the container is pulled into an extractor the container detaches from the cable and is emptied, whilst it is emptying the container and the extractor move across the platform along a rail held on the submerged platform.

The extractor and container move across to the descending side of the cable, the container is then placed onto the cables.

Once detached from the container the extractor moves back to the ascending side ready to receive a new container filled with new cold water. There can be more than two containers on a one way system.

Extraction System 4;

See horizontal cable concepts.

Streamlining

Preferably any male or female fittings on the container will be incorporated into a streamlined design, there for it is probably preferable to sue female fittings on the container, which can be more easily disguised into a streamlined object.

Container Membrane

So that the container does not create a vacuum when emptying the container has a membrane like a syringe which will change shape to compensate for the extraction of the cold water.

Either the membrane lies inside the container so that brine or waste cold water can be placed inside or the '$6^{th}$' side of the container moves down so that sea water fills the potential void.

Expanded Waste Cold Water

The waste cold water will have expanded slightly; a contractible container on the platform will retain this extra volume and place it into the next available container.

Wings

All types of system will preferably use wings fitted to the outside of the container which pass into at least one pair of wheels (and, or rails) these wheels grip the container and. The wheels are place sufficiently close together to apply a large enough force to trap the wing; the wheels can accelerate and decelerate the container as they are motorised. Each pair of wheels can move at a slightly different speed so that the container is gradually accelerated or decelerated. Alternatively the wheels are able to open and close the distance between one another, and are able to do this synchronously with the deceleration of the container. The wings can be coated with rubber so that there is good grip between the wings and the wheels.

Drag/Weight Powered Valves

There are at least two sets of valves one at the top and one at the bottom, the valve is a tube which is placed over another tube which has vents the vents allow water to flow in when the valve is lifted, the valve is lifted by at least one of drag or by being directed into a rigid protrusion.

The valve is closed by at least one of drag, the weight of the top tube, a spring, or forced open using stored energy. The top tube is placed on the inside of the container at the bottom and on the outside of the container at the top, one tube is placed over the other like a thimble on a finger, the thimble is joined to the outside of the container by a small member which is connected to the wing, when the container is descending the thimble is lifted by the drag force exerted on the wing, (the thimble is lifted from the finger) when the container is rising the thimble is pulled/pushed onto the finger, the finger tube has opening which allows sea water to pass into the container when the thimble is lifted and the thimble prevents water from entering when the drag force or the weight of thimble prevents the water from mixing into the container, the thimble tube can have a right angle at its base or fit into a groove as well as fit closely over the finger tube in order to make a thorough seal. The thimble will be prevented from lifting completely off the finger by a cage which surrounds the thimble in such a way as to ensure that the thimble does not come completely off the finger.

Screw Valves

The valve type is driven by the drag force in a screwing motion so that the valve cannot easily be lifted up Drag Valves A flap placed at a suitable angle to the direction of the moving container will provide sufficient drag for it to lift a door or valve open during decent and if its travel back up the way it came and at the same angle the motion of the container of the upward journey will force the door or valve to remain closed.

Valves/Doors/with flaps, which open the door/valves, due to drag force on the downward journey of the container and close on the upward journey, will not need electricity or motors to function. When the container is traveling down the flap will be sufficiently large and suitably positioned enough to lift the valve or door open due to the drag and subsequently the container will be open to the sea. On the upward journey the flap will be forced down by the drag force which will force the door or valve to be completely closed.

Extras

A vertical horizontal/diagonal cable system with guide wires and a driving wire the container sits on a least one guide wire and is driven by another wire the container can be detached and reattached from the wires in the same way as a ski lift, this system will be used to deliver water to onshore sites, from a terminal closer to shore, multiple containers can be held on one cable, the container detaches from the cables and is joined to an extractor pump and is then re-joined to the guide cable.

The container is built like a syringe so that a vacuum does not form when the container is being emptied, there can be two types Spring Flap for Emptying The top and bottom of a container are fitted with large spring mounted flaps these flaps only open when the correct force is applied. Specifically this allows a large volume of water to pass through the container with minimal pressure loads.

Puppet Container

A cable joined to a motor at the surface can pull open the doors, valves and/or membranes.

Double Layer Container Valves

A container with two layers so that cold water can fill the first layer so that this water act as insulation against the inside warming, Closed Outer Layer The inside layer of the container is insulated the outside is not so that as layer of water permanently held in this layer is easily cooled in the deep water although it warms it helps to provide cost effective insulation, pure water can be used so that the outer fluid is less dense than the seawater meaning that it won't contribute e to the weight of the container.

Ceramic/Rubber/Poly Urethane Insulation

Horizontal Cable Concepts

The use of at least two sets of buoyant structure which will create a length of the cable which is held out horizontally rather than vertically this will provide a platform for the diving container to rest at the surface so that it can empty, not only this but holding it horizontally will mean that, for example a 2 m×18 m×20 m container will not have its bottom 18 meters beneath the surface but 2 this will mean that in a relatively large boat the cold water can flow out of the diving container with the use of gravity. The horizontal definition includes holding the container at a downwards angle towards the surface container so that the container can empty with the use or aid of gravity.

The diving container can be held at an angle by having a different height from the surface at each end, the wheels held on one pair of buoyant supports being lower than the second pair of wheels.

One at the surface the container detaches from the cables and onto rails once on the rails the container will be connected to an extractor, preferably close to the forward facing end and at an angle so that the density difference between the new cold water and the surrounding sea water will aid the process of emptying. The extractor can approach the container from above below or from the side and will preferably be a motorised system which can approach and draw back from the container so that the container can pass at the right time.

The container has the ability to empty form the sides or from the top or bottom, the membranes on the inside would then cover the whole length and width of the larger side (in a rectangular cuboid the larger of the two rectangles, the container would empty gravity assisted and would have any opening on the side of the container, i.e 10 short pipe built in the side of the container and incorporated into the streamlined shape, motorised pipes would extend into the container pipes and purse a valve (a person skilled in valves can assist in the right choice of valve but a pursuable check valve is probably preferably. As the container is being emptied of new cold water the container fills with waste cold water. Preferably the new cold water will leave via the bottom and the waste cold water at the top.

A Detachment Mechanism;

The container is held to the cable with a catch, the catch is held tightly against the cables during up and down cycles using a contracting spring. The container must have at least one of these catches preferably more the one. The container has wings which fit in between rails and or wheels these wheels decelerate the container. Once the catch is horizontal it is forced open by a bar mounted on the platform which opens the spring because the distance between this bar and the cable increases once the catch is in line with it, as the container is being pulled along the distance between the bar and the container increases forcing the spring to open/lengthen and the container to be held by the wheels and not the cable. Wheels can also be placed underneath the container. The bar or the catch can be fitted with bearings for a smooth connection between the catch and the bar during the lengthening process. Once the catches are open the container will not move unless directed by the wheels. Once emptied the wheels accelerate the container the bar shortens allowing the spring to grip the cable again. At least one part of the catch system held to the container must be made to rotate 360 degrees in two places so that it can move from horizontal to vertical.

Figure 2:
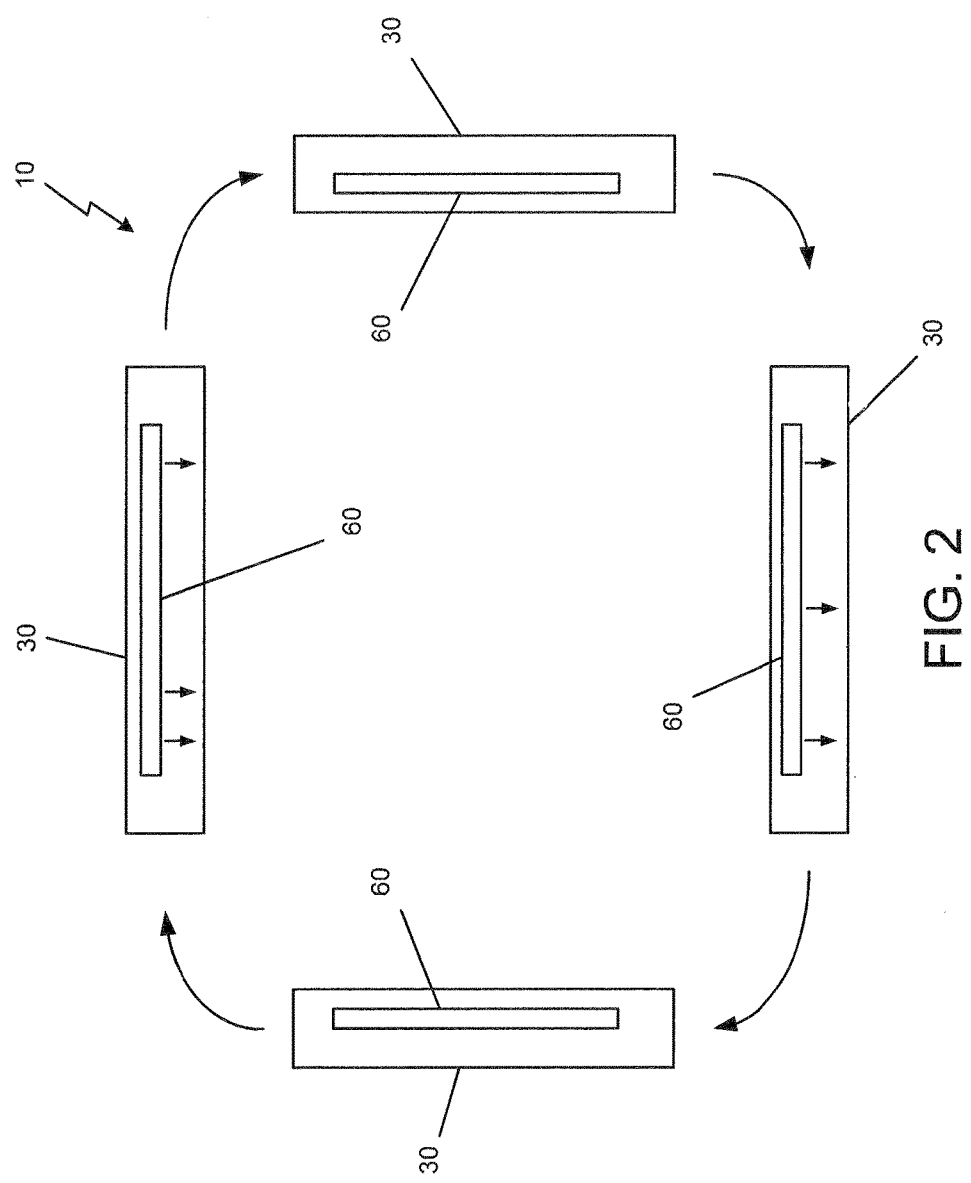
FIG. 2 is a schematic diagram of a membrane within a container of a system for raising water, in accordance with a first exemplary embodiment of the present disclosure.

This catch system can be used for horizontal and vertical extraction systems. If the system is vertical a catch prevents the container from falling Weighted Membranes FIG. 2 is a schematic diagram of a membrane 60 within a container 30 of a system for raising water 10, in accordance with a first exemplary embodiment of the present disclosure. The membranes 60 on the inside of the container are weighted or buoyant. Depending on the position of the container the membrane 60 will rise or fall, this system can be used to fill a container 30 with water and at least partially contribute to emptying, check valves will allow water enter and exit the container 30. Valves can be used to prevent the membrane from moving until the desired time.

Once at the surface the weight of the membrane 60 will at least partially contribute to the emptying of the container 30. The container can be fitted with one way check valves which are negated by the extractor, (the extractor is fitted with a needle or the like which breaks the valve open.

New waste cold water or sea water will be pumped or drawn into the expanding section as the membrane moves. Pumping the liquid into the container can act as the driving force to at least partially contribute to the emptying of the container 30 as can suction from the extractor. The location and direction of the membrane movement depends on the choice of system (one way two way etc.)

The container 30 can be fitted with vents so that it gradually releases the waste cold water. On the downward journey to equalise temperatures and so that the membrane does not have to move until the container is horizontal. The advantage of using vents to empty the waste cold water is that the waste cold water can be flushed out quickly and consistently, were the container to fill and empty in the same place the filling area would become contaminated with warmer waste cold water, the container is preferably completely flushed of the warmer waste cold water long before the point at which the container closes with new cold water.

Pressure Switches/Valves1

A pressure switch can keep the valves closed until they reach a certain depth, for example a strong syringe filled with air uses the piston to trap the valves until the piston has been compressed into its housing enough to allow the flap or valve to open. The chamber can be pressurized so that it does not open until a specific depth.

Pressure Switches/Valves2

Valves or flaps can be fitted with springs and drawn into at least one protrusion along the course of the container, the at least one of the protrusion or flap is pressure sensitive so that the motion of the container with the valves pulled back fully will break the protrusion, once passed, the flap and protruding return to their original shape.

Pressure Switches/Valves3

The container flaps are fitted with springs and at the sea bottom they are pulled into fixed protrusions the protrusions push the flaps open and so the contents of the container cool. Once lifted the flaps close so that cold water can be transported to the surface. The membrane or piston which drive the membrane can equally be forced to change is position due to protrusions.

Pressure Piston and Chamber for Filling

Preferably a container uses a system for filling comprising, at least one piston and chamber with the piston attached to the container preferably a sliding vent/door. The piston chamber is filled with air to a pressure a little less than the maximum pressure of the water at the sea bottom.

At the surface the piston is exerting force on the flap so that it is closed. As the container descends the piston does not withdraw immediately due to the pressure in the chamber, once the water pressure on the outside of the chamber is greater than the inside the piston will be forced back opening the doors.

The sliding vent can be large so that it must gradually move over an area which does not create an interface between inside and out before the container is vent able, this will lower the pressure required at the surface.

Additional options include the use of compressed air or a hydraulic fluid to force the piston back early on the upward journey. This will allow water to be emptied closer to the surface due to a reduced pressure in the piston.

The chamber can be fitted with an additional cylinder to the entire piston to fully compress the piston shaft. This system can used to vent main container and the use of cold water as insulation in a second layer.

This principle can be used to create switches to control the release of flaps vents or valves.

Extraction

Any one of the containers can be pulled directly into an extraction case, a seal is made and the contents of the containers are either sucked or pushed out, a fluid can be placed into the container at the same time as the cold water is being removed if the container is fitted with a membrane which can keep the two fluids separate. At least one extractor can be fitted to a boat or platform on the surface or submerged. If the containers are held from a ship a single cable with a weight on the end can act as a stable support for the container to be pulled along another cable either loops around this weight to form a complete 'circuit' for extra tension or the container is simply pulled by at least on cable form the surface and is sufficiently weighted to fall, puppet string or drag valves can be used to open the doors or valves. The weighted cables can be lifted back to the surface if the boat is to change location. The extractor case would be fitted below the water line and hoses would lead from the extractors to the insides of the boat.

The extractor and container can be fitted large interpretations of 'hose lock' fittings which are used in the UK to connect hoses to taps and hoses appliances. The female fitting has a simple up and down release mechanism which can be motor driven. The diving container would be fitted with the male type fitting.

Sea Bottom Cable/Rails

The cable would not be suspended the guide cables would be held taught between towers so that the cables would effectively be a pair of rails on which the containers run, one circular system which ran along the sea bed could hold many containers on one set of cables Rather than sitting with its base on the cables the wheels and plates can extend from the middle of the container to improve the container balance. The containers are driven like train carriages along the cables, rails can be used, in any case the exception is that they are pulled by at least one circulating cable. The container can detach from the driving cable preferably with the use of a non-motorised device like an ascender (used in climbing) which can grip a rope or un-grip a rope by pressing a small catch. Once at the extraction point a container catch can be pressed (preferably automatically) so that the container no longer grips the rope and the container is emptied preferably along an automated track, once emptied the catch is released and the container can be driven by the guide cable again. The Guide cable can be placed under the containers or above them.

Improving OTEC Efficiency

The closed cycle OTEC uses a pump to move the working fluid from the condenser to the evaporator, brine (either from a nearby desalination plant or the brine produced by a hybrid otec cycle) or waste cold water held in a container preferably the same diving container could drive cable and a fly wheel which could at least partially contribute to driving the pump. Waste brine from a desalination plant could be transported via a hose from the shore. Solar Fresnel lenses could boil water to make steam during the day to drive this pump and additional brine would be created by the process, the waste heat can be used to warm the surface water slightly more than usual. See brine gravity diffusion system.

'Descender' Detachment

A climbing tool used to lock against a rope so that it cannot move down a rope unless a catch is released if modified would allow for a container to cease to grip the cables when the device is unlocked and to lock against the cables during upward and down ward journey when the catch is locked against the cables.

Cables Driving Motor/Tension Motor

One motor drives two pair of wheels one pair of wheels drives the cables, the other simply drives to create tension, one motor could be used in the same way as one motor is used to drive four wheel drive car.

Motor Less Turbines

Rather than charging a battery a turbine rotates a shaft which does useful work for the container system drives, this can be used to drive the syringe piston the membrane or used to delay the opening of a valve or door by driving a screwing shaft whose length changes as the turbine spins, The turbine spins in two directions so that it lengthens and shortens depending on the direction it is travelling. Rather than using a drag valve the doors or valves can be driven open by the turbine rotating a shaft whose changing length pushes and pulls the door or valves open or closed.

Piston which Extends from Both Sides of the Container

At least one pole/tube/piston/bar etc. Extends through the container and extends from both sides of the container. The middle of the pole holds a membrane which can separate the cold water from the sea or hold two bodies of water if the container has six rigid sides. A tight seal is made between the hole in the container through which the pole passes and the pole, preferably a low friction rubber or plastic 'bung'.

At the end of the downward journey the pole is driven into a hard flat surface whether that is a fixed plate or rock, the cable drives this container in to the rigid surface and consequently the membrane moves, when the function is performed at the sea bottom the container draws in cold water.

At the surface a two way extractor is designed in such a way as to allow the pole to pass through it (the extractor is designed with a hole which will allow the pole to pass through it and for the container to dock with a rigid extractor which is placed directly above the container.) Once docked with the extractor the pole(s) is pressed down using a motorised mechanical arm so that the fluid within the container is forced out.

Alternatively the extractor can be fixed through holes to bars which allow it to slide up and down, thus once passed through the holes in the extractor the ends of the poles can move into a rigid surface forcing the poles down, emptying the container through a pipe box or second extractor at the bottom side.

Alternatively the upper bar can hold streamlined containers with water in which due to the extension of the poles and the moving extractor will place them above the sea surface, the water will then become heavy enough to drive the poles down. If the container simply draws in sea water from the top, only one extractor from the side or bottom will be needed. If two extractors are used and or if waste cold water or brine is added the water section used to drive the poles will have to pass the upper extractor either the extractor is fitted with a hole or the poles are curved or the upper extractor is positioned slightly to the side of the container.

Alternatively the upper poles and extractor are fitted with rack and pinion gears and motors, the motor drive the poles down to empty the container. The poles can pass up through the gear because the motor is retractable or because the motor has a neutral gear. The motor is held on the extractor. Additional rigid poles can pass through the extractor, once the container and extractor have formed a seal these rigid poles are used to hold the container to the extractor either with the use of an automated clamping system or automated clicking system 9 rid container pole has a groove the extractor has a retractable opposite to the notch so that the container is held in place) or with rack and pinion gears and motors.

A Single Pole

At least one pole extends from the membrane and through the container at only one side of the container preferably the bottom; the membrane within the container is at the lower end of the container at the sea bottom. As the container reaches the bottom the pole is driven into a rigid surface which then moves the membrane up within the container. As the membrane moves new cold water is sucked in through at least one valve or door, and waste cold water brine or sea water is driven out through at least one valve or door/flap. This process fills the container with cold water, the cold water is drawn in through one way check valves at one end and push out through another set of check valves at the other. The container is then driven back to the surface.

At the surface the extractor drives, (with the use of a motor driven pump) waste cold water, brine or sea water into the upper section through filling points (upper check valves must be prevented from opening), which drives the membrane down, forcing the cold water in the lower section into and through at least one pipe within the container (pipe box) (the pipe only has openings at the bottom) held within the container and into the extraction system. The cold water passes through the pipe and into the extractor. The emptying process can be the same speed as the demand rate or faster, than the demand rate, slower if multiple cable system are used per heat engine, heat exchanger etc. An insulated bag or flexible container can be used to briefly hold an excess amount of cold water.

Preferably the ends of the containers are streamlined the curved area of the container will house the valves/flaps so the curved area will provide space for the valves to open without the membrane interfering.

Since the use of waste cold water is valuable to efficiency and pollution minimisation, adding the cold water is useful, the use of the pipe within the container allows for thee to be one rigid extractor which is economically efficient, it also creates the precise flow rate and minimises any gain in temperature of the cold water through friction.

Due to the location of the membrane and to compensate for the contraction of the waste cold water during decent the waste cold water section can be fitted with a least one valve or hole. If a hold is used it must be covered/plugged by the extractor at the surface.

If this method is used there will be an anomaly between the bottom container and the top container relative to its extractor. Either the bottom container must fill quickly using spring flaps (a relatively large surface area venting system for transfer of large volumes at low pressure) or the top container must engage with the extractor and either come off the cables or the extractor can be placed on bar which allow the top container and the extractor to gradually rise whilst connected to each other.

If the container comes off the cable the lower container can gradually fill but must be return to the height it was at before the protrusions were depressed before the upper container reengages with the cables at the surface. The driving cable system at the surface may consist of addition pairs of wheels to hold the cable between these wheels for extra traction during the weight imbalance can also act as brakes.

Rather than using the pipe box concept the extractor can be placed to the side of the container at its lower inside end two extractors can be used one to drive sea water into the top and another to receive the cold water. The upper extractor makes a seal with the entire upper surface and pushes fluid into the container through at least one opening.

Poles on the upper side of the container can be used to initiate the relationship between the upper extractor and the containers. The poles pass through holes in the extractor, levers and grooves can be used to hold the container and extractor together and can be released to allow the extractor and container to separate.

'Clickers'

Like pinball machine pressure sensitive arm which can be electronically controlled allow the ends of a piston to pass the clickers, at the sea bottom this allows for a piston end to be held in place whilst the container is lifted this process will fill a container, once filled the membrane will no longer be able to move and so with an increase in force or using an electronic signal from above the clicker will release and the container will be allowed to rise.

The electro magnet (depending on the end at which they are placed) would prevent levers form lifting or falling until the power in the magnet was released. The piston is designed so that it can press the levers and be caught by them. The electromagnet is held rigid on a frame and lever are either forced to be held by the magnet or when the magnet is released they can move.

Two Cable Systems Per Heat Engine, Heat Exchanger Etc.

So that a continuous flow of water can be generated preferably at least two, 'two way' or two 'one way' systems can be used per heat exchanger.

Prefabricated Systems with Removable Key Sections;

Like the construction of a cruise liner the otec system can be built in sections which can be added to the main body. Ideally held under the water in a container (equivalent to the hull of the boat) this has three main advantages; firstly the entire otec system can be premade as one block with key sections, The block will simply attach to the otec submerged platform, or onto a similar nearby platform, making installation rapid and if built like a cruise liner a single key section can be removed and serviced with an identical section replacing the old section immediately. The serviced section can then be reinstalled in a new development or used as a spare. Large scale phased projects will consistently be creating new sections and so any serviced sections can be installed into new systems.

Preferably the sections can be released from the main container and slid out from it, rails will extend from the platform outwards and or upwards, or rails can be easily connected to the platform when necessary. Once slid out from the container the section can be winched to the surface, the replacement section is then placed onto the rails and slid into place.

Preferably the otec containers will be capable of operating under the surface, and will simply be connected to the subsurface platform but with a personnel ship/command and operations platform or barge in the vicinity the control of the systems can be done from land using satellites/computers and or from the command ship.

The overall offshore otec or lttd system must have a warm water intake and warm water waste disposal system which can be achieved by using a separate cable system or hose and with cold water cable systems using hose designs for warm water delivery, these hoses can be held on subsurface platforms which consist of at least one buoyant support and a frame onto which the platform is placed.

Submerged Systems

Figure 3:
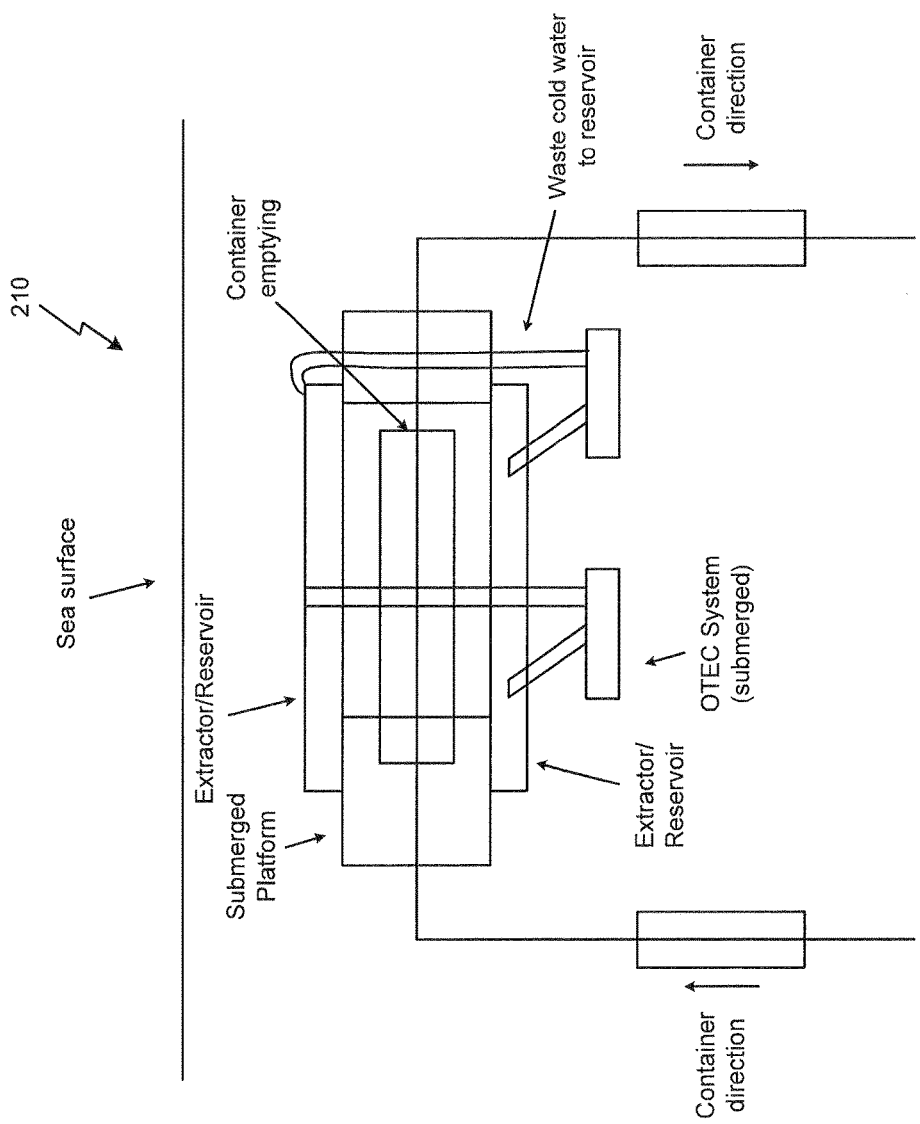
FIG. 3 is a schematic diagram of a submerged system for use with a system for raising water, in accordance with a first exemplary embodiment of the present disclosure.

FIG. 3 is a schematic diagram of a submerged system 210 for use with a system for raising water 10, in accordance with a first exemplary embodiment of the present disclosure. The use of traditional otec systems including turbines evaporators etc., so that these systems do not need to be modified structurally (to remain 'off the shelf' products) they are placed in a reinforced atmospheric casing, this casing prevents the submerged systems from being damaged by pressure, there may be more than one chamber with several different pressures, some of these layers may contain a liquid or foam, and a suspension system to absorb some of the pressure.

This would be for the sake of taking advantage of the reduced mass of the cold water by being submerged. All system parts will have a buoyant section which will also prevent them being lost if the system breaks apart, a small tether will also hold the system together even if broken apart. All systems will preferably be fitted with a signal or switch controlled device which can trigger an air tank to fill a fully sealed air lift bags, alternatively a small pressure vessel will break at a certain depth which will trigger the release of the air tanks and air lift bags, this can be achieved by coordinating the damage of the vessel with the breaking of a circuit which would release an electromagnet, which would result in the release of air from the air tank. The system can be programmed to render the components neutrally buoyant and a depth bellow the sea surface so that the parts do not surface into a raging storm.

The system can be fitted with a roof preferably an elongate bell shape (like a Portuguese man o war or a rugby ball) to render the roof hydrodynamic from all angles.

An Underwater Turbine Design Protective Coating.

A standard otec turbine is made, at least one ring made using a strong material is placed around the turbine, additional pieces of metal are laid between the rings, and the rings join the turbine at its top and bottom.

Sheets are fixed onto the reinforcing construction; in between the metal sheets foam or liquid may be placed to reduce weight an omit air spaces, there can be more than one layer and the purpose of the foam is to create as small are air space as possible.

This is intended to allow a turbine to operate relatively shallow water but beneath the ocean waves, preferably the weight of the turbine will be neutralised. The same method of protect the system can be applied to any evaporator or condensers use and also the LTTD systems. Underwater lttd systems could transport water to shore using the buoyancy of the water.

Closed Cycle Containers'

Closed cycles container use the same cold water, the waste cold water descends and is conveniently exposed to the surrounding cold region for a period of time, the cold temperature is transmitted through a heat exchange system, and consequentially it does not expel waste cold water. The heat exchange surface is exposed at the right depth using a mechanical system/device.

E.g. the container can use the spring door system to force onto doors or be dragged onto a pole which pushes the door up to reveal the heat exchange surface.

Closed cycle containers open doors to reveal a surface such as titanium, aluminium for heat exchange, The container does not release the cold water or warm water the two way system takes advantage of period the container must spend of the bottom this is especially relevant to two way systems.

Container must have expandable section to compensate for expanded waste cold water. The container can have heat exchange pipes within it which allow sea water to pass through which create a large surface area for heat exchange, these pipes can be covered in the warm regions using doors.

Preferably the Water can be distilled or slightly saline water (slightly less dense than sea water but not distilled) or ordinary sea water. Using slightly saline water could reduce the relative weight of the rising container to zero (if the container itself is neutralised using a buoyant liquid to reduce its mass relative to the sea water, leaving only a slightly buoyant container to pull down.

More than two, two way systems or two one way systems which start and stop can be used to ensure there is enough time to cool the water.

Closed Cycle Warm Water Intake/Chlorine Recycling

The warm water intake uses containers as above; preferably double the size or at least double the amount of warm water is provided. The warm water system does not require a mechanical system to expose the container to the warm water, and the heat exchange surface can be exposed constantly, preferably the container will be able to fill and empty and the same time using the rigid container with movable membrane or two bags (the bags comprise multiple hoses to create a large surface area and the use of a pump to circulate.

The system will use a cable system to pass containers up and down or horizontally, to mitigate the cooling of the warm area around the containers.

Alternatively the cooled fluid (not the ammonia in low pressure) is passed in a pipe (preferably glass) loop at the surface or near the surface. The virtue of the pipe length is that the heat exchange system can be simpler and feature at least one sump region container with mixes the water using stirring and a small no of pipes on its sides using pumping and or a maze on the inside to create a long journey. The pipe can feature small hoses and bags to increase surface area on the outside and areas which use glass pipes and plates at the sump region for heat exchange, as this part of the system does not feature low pressure. The hoses lengths can descend and feature high pressure in order to heat up the water slightly. Areas within the pipes include regions of packed fibre glass, wool, rope, etc. Though which the water can be forced at high pressure to warm through friction, heat from the pumps can be used If the pumps are placed inside this system and sump regions for additional turbulence, regions which create back flow by placing u shapes within the system.

The water would pass through at least one 'pipe' and would be designed for optimal heat exchange the pipe would be designed to travel a distance which was calculated to be long enough for sufficient heat exchange. Any design which increases the exposed surface area including multiple pipes/ hoses and pipes which pass through the pipe with their insides exposed to the outer sea water. The pipe can feature a sock which is pulled over to eliminate bio fouling with the use of chlorine.

Preferably in a closed cycle OTEC system the warm water will be at least one of distilled, chlorinated, a brine solution pre-treated using any 'anti-bacterial' method, in principle free from any agent who causes bio fouling and or and fluid which does not cause corrosion.

This working fluid is passed over the heat exchangers warming the ammonia and is then passed back, advantage is that the system can use a heat exchange system of lower efficiency and therefore cost, and prevent corrosion. The use of plastic bags would reduce corrosion and bio fouling on the heat exchangers allowing aluminium to be used rather than titanium.

This system will only work in closed cycles.

For an open or hybrid cycle new warm water must be added (there must be a one way warm water intake along the piping system or in the container). Warm water will be added according to the rate at which potable water is being produced, all remaining water which is normally passed into an outfall pipe is re added to the container in the same way as the waste cold water, consequentially no waste water is released into the sea and the warm water can remain constantly chlorinated.

Preferably the container system or piping system will have at least one contractible region for new warm water intake/changes in volume.

This system can be used in conjunction with an untreated warm water intake system.

A heating element can be sued to clean these outer surfaces.

Cleaning

All of the heat exchange surface which interface directly the warm surface water can be fitted with motorised cleaning machine the machines could consists of rack and pinion rail s a motors and at least one cleaning pad which rubs the heat exchange surface, constantly as it moves along the machine can simply move along or along and up and down depending on the complexity and type of the heat exchanger.

Even flow of warm water and constant distribution of temperature differentials can be removed using a hybrid wave pump which will use electricity when there are no waves.

Computerised Systems

The use of satellite communication system will allow for the system to be monitored and controlled from a boat or from the shore.

The system will use sensors and transmitters so that multiple small systems can be monitored from a single control room on land or in a boat or platform.

Treatment of Condensers and Evaporators

In order to at least reduce the amount of chlorine used to prevent bio fouling, the system can circulate in a separate closed cycle a solution of brine; large stores of brine can be contained at the surface and could even be warmed using Fresnel lenses. This large store will allow for the otec system to continue operating.

The closed cycle works as follows;

The brine is placed in the evaporator where is kills bacteria algae etc. and is evaporated as though it were ordinary sea water. The brine is released back into the container it came from, additional sea water or the condensed water is added to the container to keep the concentration of salt high.

This closed cycle principle can work for chlorine solutions as well.

Preferably the use of brine discharge from a desalination plant lttd. system open or hybrid OTEC cycles can be used as some brine will mix with new warm water if the system is to be kept running. The system can use a warm water heat exchange system as above to rewarm the brine solutions.

Heat Exchangers

Figure 4:
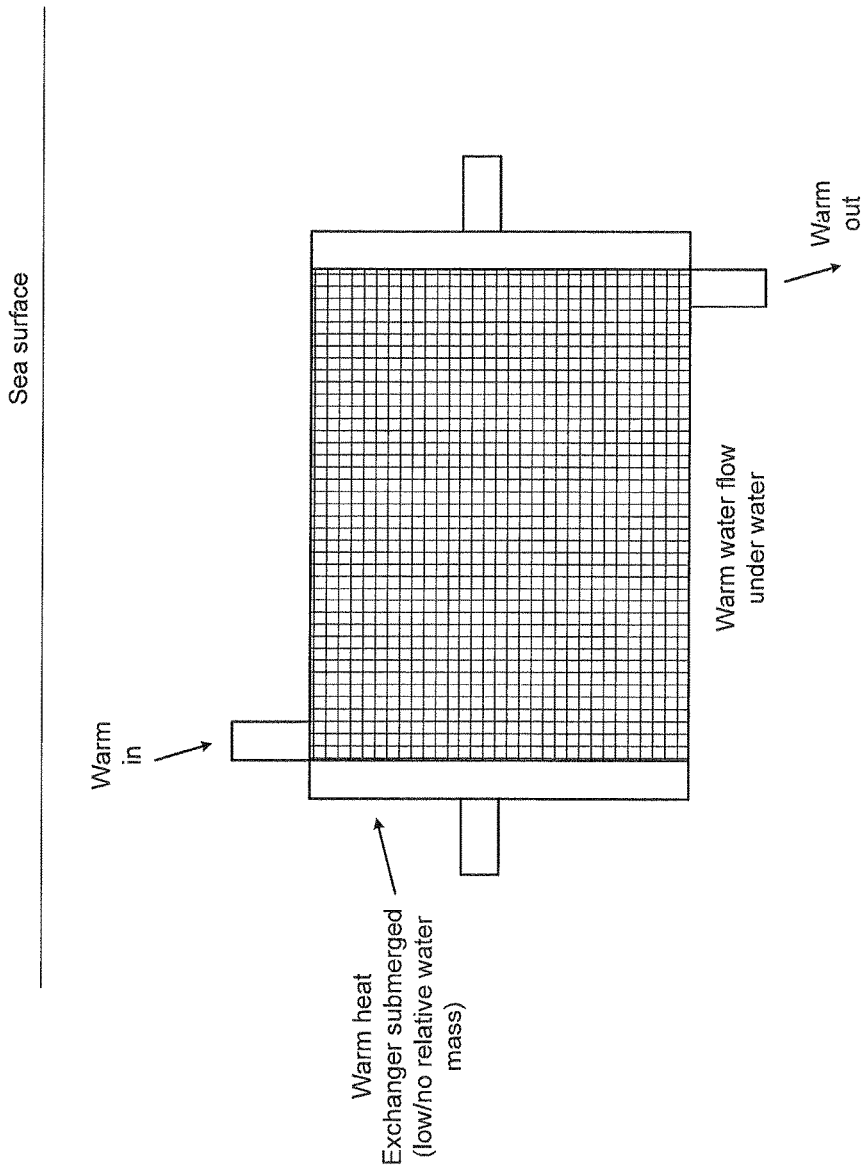
FIG. 4 is a schematic diagram of a submerged heat exchanger for use with a system for raising water, in accordance with a first exemplary embodiment of the present disclosure.

FIG. 4 is a schematic diagram of a submerged heat exchanger for use with a system for raising water, in accordance with a first exemplary embodiment of the present disclosure. The remaining OTEC systems are placed to the sides of a horizontal cable concept system, with the cold water heat exchanger close to the platform; the remaining OTEC systems can be placed on either side of the platform or on the 'roof'.

As the system is held under the water the pipes can interface directly with the sea water for warm heat exchange, this will lower parasitic energy expenses. A flow of water must be provided in a way which optimises heat exchange. If completely open surface is used heating elements can be used to prevent bio fouling. Heat exchangers being heated can be shut off from the turbines and the boiling ammonia sent in pipes via the waste cold water to cool it down this ammonia would pass in a loop.

Warm Water Plate Heat Exchanger

Two plates with pipes running through, ammonia passes horizontally in between the pipes, warm surface water is passed through the pipes horizontally. Warm surface water is also passed upwards or downwards along the outside of the plates. The plate can curve back on itself the pipe warm water intake can be from above or below with the pipe outlet passing in the opposite direction.

The plates can be corrugated in between the pipes, corrugation pointing inward or outward.

For a cold water heat exchanger cold water is passed through the inner pipes and over the sides.

Walls can be incorporated to control the flow of the waste cold water and waste cold water.

Flattened Pipes

Comprising two wide curved sheets (top and bottom) and two narrow curved sheets (sides) this is so that the inner space of the pipes is narrow to increase heat exchange efficiency and flow pressure.

This design can be repeated on small and large scale to copy the lungs and digestive system etc. of the human body.

I.e. one large flattened pipe is surrounded by smaller version of pipes with the same design. These smaller pipes can be placed near tension areas (where the main pipe narrows or turns) of the main pipe to lower pressure. These smaller pipes can be fitted with pumps and can be coiled like rope strands.

This design will work for cold water/steam and warm water/liquid heat exchange.

Additional pipes can be joined to these pipes for steam export and other additional pipes can send working fluid back to the 'beginning' so that the heat exchanger can have a flow with a dead end with the heat exchangers acting like leaves.

The middle section of the pipe can be fitted with a V (or two one facing in one facing out) to increase surface area and the sheets of metal can be corrugated. If the pipes spiral theses V's can act as fins.

Revolving Heat Exchangers with Fins

The heat exchanger comprising pipes preferably flattened for heat exchange efficiency for warming cooled working fluid in a vacuum. The heat exchanger consists of a large no preferably flattened pipes. The network of pipes is capable of revolving on a single or multiple axis at both ends; the pipes are fitted with fins along its length so that as the pipes revolve they create a flow of water along the outside of the pipes.

Alternatively the pipes are fitted with fins which rotate creating a flow of water along the outside but the heat exchange pipe remains rigid.

These fins create a flow of water so that no part of the heat exchanger can trap uneven amounts of water temperature. An additional flow of water can be produced using pumps and pumps can be used to import and export water from the region of the heat exchanger.

An additional pipe can be placed around the heat exchanger so that it can be treated with chlorine or it can be exposed and bio fouling prevented using heating elements. This outer pipe can join to hoses so that water can be pumped in and out through its walls.

Segmented Enclosed System

Alternatively or at least partially incorporated the heat exchanger is enclosed within the outer pipe and has neither fins nor revolves but water is pumped at angles so that water passes from one end of the pipe to the other, extractor pumps draw water out so that pressure is decreased e.g. A 10 meter pipe has 10 input pipes and 10 extractor pipe along its length and preferably has 10 sections of the inside of the pipe are separated from one another. Input water travels 1 m through heat exchangers and is extracted rather than 10. Each 1 m section has a positive and negative so that the flow is consistent.

A heat exchanger wherein the centre of the heat exchanger feature a pipes (preferably flattened) heading north to south with the heat exchange elements heading east to west and passing through an outer pipe wall into a second pipe. The system can revolve or lie stationary and can feature the segmented system.

These non-revolving closed heat exchangers can be used for the cold water interface and for desalination with the steam in the pipes.

As the ammonia is buoyancy under water the revolving of the pipes will create buoyant periods where the ammonia will raise naturally this will increase inner turbulence improving heat exchange.

Heat Exchangers Like a Coiled Rope (Revolving)

The network of pipes has the appearance of a modern steel wire rope so that each pipe passes towards the outer side of the network and the inside of the network. Preferably some of the 'wire ropes' are missing to create void areas within the coiled network and there is a relatively large void in the middle or a single pipe. The system is provided with a large flow of fresh warm water.

Preferably the coils feature at least one of fins a revolving system, pumps and segments Preheater A container which is designed to be able to withstand low pressure with a series of pipes or holes to allow heat exchange. The insides of the container can feature a single channel so that the container acts like a very basic radiator (including basic additional heat exchange surfaces). The heat exchanger is not extensive, not made from expensive metals and relies on a longer period of time to warm the working fluid; preferably the ammonia will not boil in this preheater but will warm enough so that the extensive heat exchanger with expensive metals such as titanium can be minimal in size. Preferably the preheater features a low pressure flow and a large volume and a product which is close to boiling. Additional steam pipes can be added in case steam is produced.

Rather than exposing a large heat exchange surface the inside of the container features stirrers and a small no of external pipes which suck in some of the working fluid and pump it some distance back to where it come from. These pipes can be placed from the bottom side of the container to top side of the container or travel inside the container to take advantage of buoyancy or neutral buoyancy.

This process can be used in the warm detailed heat exchangers as well.

The container can be provided with a flow of warm water from the surroundings. The preheater can act as the branch of a tree with the extensive heat exchangers jutting of from it each leading to an OTEC turbine. The preheater can be fitted with corrugations to increase surface area.

Near Shore or Near Rise/Shelf Bottom Mooring

For areas with steep shelves and for mooring a cable system on a steep rise, simply placing anchors for any mooring requirements will not work and for simplicity of servicing and ultimately removal of the entire mooring system the system will preferably; use at least one cable anchored to a fixed point in shallow water, the cable(s) will extend down the shelf, and will have a dead weight at the end. From this dead weight mooring cables can extend upwards, during the construction they will have floats attached to the surface end. Marker on the cables will show any differences in height at the bottom. From these marker adjustments to the shape of the bottom wheel system can be made to tailor it to the shape of the sea bottom. If there are different lengths of cables different lengths of tubes will be lowered down the mooring cables to create the foundations for an even platform. The tubes can have flat tops, be fitted with additional weight and cushioning, suspension etc. to make a suitable platform for the main cable system.

The bottom wheel system can then be lowered along the mooring cables. The subsurface (surface) platform will then be pulled down along these mooring cables to its position below the surface and 'tied off'.

Alternatively the bottom wheel system consists of a weighted cage/structure/scaffold (which can be approximately in the shape of a L or equilateral L on its side so that the length of the 'L' creates a flat surface extending out from the steep slope) with mooring lines to the offshore sub surface/surface system and bottom wheel or tube system connections for the driving cable system to the surface. The structure would consist of at least one L preferably at least two joined together metal sheets placed over these L joints will create a platform for any bottom functions the system may have.

Alternatively When preparing the system and in order the make sure the system is level the pair of ropes at the bottom have spacers to keep the width accurate, the ends of these cables are weighted down. At least one pair of ropes preferably at least 3 extend up from the bottom cables to the surface, the ropes have an exact length and a buoyant bar is held between them, the angle of the bar will show how level the cables at the bottom are and the depth. The weight can be lifted up and adjusted until a suitable point has been found. For fine tuning the frame can have a jacking system which can be adjusted so that the lengths of the frame change.

Alternatively based on the results of the buoyant bars a frame will then be constructed, joined to the bottom cables at the shore and then pulled out to sea using a cable and tow boat or lowered down the mooring cables from above.

Preferably any one of these systems will have an empty fully sealed air lift bag and will join to the surface via a hose; if the system needs to be lifted a buoyant liquid can be pumped into it.

In addition to the use of ropes the cage can be fitted with pneumatic drills/pile drive in order to create fittings into the sea bottom.

Alternatively a single cable extends from the shore down the rise; the cable has at least one dead weight on the end. A single 'tower' j consists of two joints (one for horizontal change and one for vertical) it is joined to the grounding cable with a protective rubber section covering the cable. Preferably the mooing cable has a protective sheath the top end of this tower holds stored buoyancy which creates a gradient responsive upright tower regardless of the main vertical gradient and any lateral gradients due to the buoyancy At least one mooring extending to the surface is held by at least one of;

The bottoms weighted mooring cable

The tower,

The dead weight. The platform for the wheels is placed on this tower, either the platform for the wheels/pipes is fastened to this tower or the platform is lowered on top of the tower so that it can be lifted to the surface for servicing simply.

Any of the aforementioned systems can be placed on flat bottoms or steep rises. The towers/frames can e fitted with tension/suspension joints.

Preferably at least two mooring systems side by side can join one upper subsurface system. A person skilled in tensioners etc. can add finishing touches to the mooring cable, anchor/platform relationship at the top and bottom.

Suspended Bottom System for Very Deep Water

The cage (anchor) is held to the sea bottom resting on the sea bottom if the surface is flat and anchored as above it if is on the continental/island rise. The bottom wheels or tubes (tubes are used rather than wheels to avoid large wheels and 'derailing' of the cables) are mounted on a similar sub surface system to the one at the surface, The wheel platform will be suspended above the lower anchor mid water in the same way as the top subsurface platform is suspended.

The mooring cables extend through the mid water platform and up to the surface bars/beams extending out form the mid water platform will keep the cables away from the bottom platform. The length of each single mooring cable can be split into at least two sections separated by a buoyancy module reducing the weight of the mooring cable as the buoyancy module will at least reduce the weight of the cable section beneath it.

Electricity/Water/Transmission Line

A series of subsurface platforms will provide a mid-water support for the transmission of any produce created by the offshore system. These platforms will be place within the reach of scuba divers for easy access but will prevent the risk of storm damage. Metal tubes similar to scaffolding and preferably sealed (to create buoyancy) can be linked together to from a semi rigid support for and cables or hoses. If this system is crossing over a rise the mooring of these subsurface platforms can be joined to the same cables used in the mooring of the wheel platforms (Near shore or near rise/shelf bottom mooring), one after the other back to shore.

Preferably cables and wheels systems fitted with tensioner or suspension joints of some suitable sort.

Landing Craft Surface System

Landing craft for areas with large reef systems or very remote areas where there are no ports where the area behind the outermost reef would protect a landing craft, the craft can navigate the shallow waters or even be winched onto shore. In the event of a storm the landing craft would hide behind the reef. Hoses leading to the craft form the subsurface system can be connected and disconnected to deliver water to the otec landing craft.

Sensors, Trip Switches, Catches Etc.

Moving container passes trip switch to engage systems/ signal docking has occurred to computer which engages extractor.

Extractor with Battery Charger and Air Compressor Attachment

The extractor and container are fitted with a plug socket so that the container can charge with electricity the container holds the male ends.

Once connected to the extractor Container a flow of electricity charges the container battery or simply supplies power for container electro magnets.

Alternatively the plug socket is used to drive compressed air into tanks on the container.

Optionally Electronic codes triggered by electronic connection to determine which valve remains closed and which valves remain open. This is useful if the container surface facing end alternates (one way system).

Sliding Door Filling

Container uses sliding door to fill which uses compressed gas or a motor, the sides of the door are streamlined and curved so that the inner curve forces water into the container once the doors are opened. The door opens to reveal a grille so that fish cannot enter. Preferably at least two doors preferably at least one at each end.

Container Extraction Design

Sliding doors with ridge to form male port and extractor with female groove making very large vents for water extraction, either at ends or sides, sideway moving membrane. Tubular shaped containers.

Spring Loaded Catches to Detach Containers

A relationship between protrusions and springs wherein by the protrusion is a curved pole, the container spring is connected to a loop hold which passes the protrusion as the protrusion angle changes the spring is forced open so that it is opens a gripper releases the container from the cables, this can be coincided with a another set of protrusions rails and catches so that the container is held firmly in place.

E.g. The container has poles with notch in at both ends the extractor has a flap which is pushed up by these protrusions at the surface the flap interact with the notches so that the container cannot fall. In addition Wings on the container interact with wheels which can be sued to decelerate and or accelerate the container, finally springs are used to hold the container to the cables some of these join to the cable may only guild the container and cable whilst one set of grippers on either side actually grip the cable. The guiding grippers don't grip but cover the cable in such a way that as the container moves through 180 degrees at the bottom the cables force the container to change direction. Since the non-gripping grippers are not directly connected to the cables they can be retracted at leisure using a protrusion or electromagnet triggered by a connection with the extractor so that the container can move away from the cables and across to the downward travelling side.

Spring Loaded Catches to Detach Containers (2)

A container which is joined by at least two catches on either side of the container will be difficult to remove from the cables, as the container would have to be driven through two open bars at the same time, one novel method of removing the container without this problem is as follows, The container gripper have opening through which bars connected to the extractor pass, the bars comprise of two section, once both container grippers have passed through the pole the bar expands from top to bottom at the same time so that both grippers open at the same time. Preferably the container grippers are fitted with a second set of spring which allows the grippers to be pulled in. This allow for a one way continuous system to hold the container upright and for it to pass the cables without interfering with them, once the grippers have detached from the cables the bars joined to the extractor are pulled in.

The bar is driven open and closed by using at least one of pressurised air, pumping a liquid or with the use of a motor, the container is potentially held by its spring tightly enough against the bars to prevent the container from falling, however preferably the container will have wings and the extractor will have wheels, at least one of which is capable of driving and accelerating decelerating the container. In addition each end of the container may be fitted with grooved bars which pass through the extractor which lift a catch which allow the container to pass only upwards, once emptied the catch is pulled away from the grooved bar so that the container can descend, the bars widen so that the grippers are in line (cables passing inside the open grippers) with the cables the catch is released and the container is driven up to speed at which point the bars contract and the container is re-joined to the cables.

Preferably the cables themselves will not slow down however it is possible for the cables to slow down or stop to allow the container to be re-joined safely.

Preferable the insides of the container gripper hold small wheels and the bar a small rail.

Springs on Doors which Pass Rails to Open at Depth

The doors on the container are held shut by springs as the container descends it passes at least one bar which changes its angle so that the doors are forced open.

Alternatively/in addition Valves or flaps can be fitted with springs and drawn into at least one protrusion along the route of the cables.

At least one of the protrusions/flaps/catches is pressure sensitive so that the moving container will initially open the flop but will break open allowing the container to pass when the force of the container is too great for the catch this will occur when the container is at the point where it will either be stopped by the catch or break it open.

Deeper Buoyancy for Near Surface Platform

Buoyancy stored well below the surface joined to the subsurface platform through 'girder's additional girders can extend to a point above the surface to make an all in one platform. Some platform may hold cable and otec system under the water whilst at least one will hold a system for placing a habitable area above the surface which is unaffected by wave height for controlling/monitoring the systems.

Non Submerged Platform Surface System and Non-Moored System for Hydrogen Production A ship, barge, platform with an L shaped attachments at the side, at least one L shaped attachment act as the platform for the cable system. The l shaped attachment can run through a groove so that the L shaped attachment does not follow the movement of the boat too closely. Should the boat move down quickly the l shaped attachment will not follow at the same speed.

Mid Water Bottom System

At least one metal tube through which the cables run the tube is weighted so that it is not lifted by the cables. The tubes holds wheels keep the cables from kinking and allow for a one way continuous system to be placed on a boat.

Insulation Using Concrete;

Insulation using reinforced concrete

Insulation Using Concrete and or Rubber and Strong Pipes to Create Variable Buoyancy;

The pipe (at least one of full circle half circle quarter circle etc.) will contain air or a buoyant liquid installed can be large enough to at least reduce the weight of the containers insulation, and the weight of the cold water.

The use of strong pipes filled with air will not change due to pressure and so will remain the same buoyancy and will also provide excellent insulation and hydrodynamic shape (different sized pipes create a curve—a metal sheet small section of rubber or concrete can be placed in the spaces between the pipes.

Preferably the air filled pipes will be fitted with a syringe mechanism; this will allow the air space to compress on decent which will lower the buoyancy. This will allow for the cold water to have optimum buoyancy at the surface and minimal buoyancy in the deep water where the container will become buoyant if it uses constant buoyancy. The interface between the bung/membrane and the outer water should be concealed in order to optimise streamlining, with the variable pipes section which fills with outer sea water being at the rear.

On the upward journey the air space will expand gradually forcing the water out; since the water inside the pipes is cold the insulation should not be affected.

Alternatively the addition of a motor will allow for the container to achieve greater buoyancy than the external water pressure allows and allow the buoyancy to be fully variable. This will allow for the containers at the surface to adjust to the new weight of the waste cold water by compressing the air space. Preferably the container weight will be neutralised by this system. Power for the rack and pinion motor can be drawn from a chargeable battery. The regulation of the buoyancy can include a computer programme.

The combination of concrete and pipes will create a strong reinforced layer of buoyant insulation. Rather than using pipes or in conjunction with pipes, reinforced rectangular cuboid or half/quarter circle 'syringe' can be used.

Expanded waste cold water will require a reservoir at the surface or on additional space within or on the container. Some of the pipes can join to the extraction system add allow for waste cold water to be added to the outer side of the pipe section this will compress the air, which will be advantages due to the relative change in mass between waste and fresh cold water. The expansion of the chamber on the upward will gradually force this water out.

The valve holding the water cold water in can be released on the downward journey so that an interface is allowed between the waste cold water and the outside. The exposure of the pipes will cool them every time the container descends.

The use of this variable buoyancy system can extend into systems which are no longer pulled by the cables and are simply guided by them, the container can hold negative buoyancy so that the descending ascending journey happens naturally, such a system would require for the container at the bottom to be driven by a grounded driving wheel or a stored propulsion system so that the container would move in a horizontal direction. The use of negative and positive buoyancy can be used to overcome the drag The amount of drag relative the cable strength at key moments for example at the turning points where the hydro dynamic profile was lost to the extent where the cables might break if the container were being pulled inducing positive or negative buoyancy would overcome the drag so the cables did not have to.

Alternatively In order to prevent the cables from breaking a sufficiently large turning circle must be created or the container must be traveling under its own power but at a slow speed or with a venting system to prevent high drag by 'opening the container.

Using a large no of passive pipes, with a hydraulic system to alter the volume of these pipes at the surface only using a large no of pipes will allow for the buoyancy to change without diving motors.

The pipes will be closed using energy on the downward journey.

The buoyancy system can be incorporated into the section walls of a horizontal cable concept type system with the membranes moving from top to bottom at the surface, and can comprise a plurality of small pipes each with a piston, all of which join to a horizontal bar which is driven by open by a main 'syringe type' piston pump. A motor or solenoid switch allows for air or fluid to be forced into the chamber expanding it forcing this chamber piston and thus the horizontal bar and adjoining pipe pistons up to create relative buoyancy within the pipes, pressure can be released using a second solenoid switch, valve or pump. Within this system some of the pipes can remain fully sealed to create a weightless or partially buoyant container and can be at least some of the frame bars of the container. The piston head (bung/seal) can be hydraulic or pneumatic in order to create high pressure seal. The working fluid for the drive piston can be a buoyant fluid including potable water and stored in a bag.

Rather than using variable pistons closed chamber fill with a buoyant liquid on descent this liquid is either held in a compressible tank or in the rigid chamber. On decent the liquid is pumped into the chamber with the aid of external pressure on the compressible tank/bag and the air is sucked into a second rigid tank or mixed with fluid. Differing positions allow for the air to be released into the rigid chamber with the two fluids separated by mass difference.

On the upward journey the air tank into which the air has been compressed is opened air rises into the tubes, the liquid fluid is sucked into a bag using a pump, this bag is then sealed with an electronic valve. On the decent the fluid is pumped into the chamber replacing the air which will be sucked into the rigid tank it is also forced into the pipes due to the pressure on the bag.

The pressurised air can be held by a double layered skin on the HDPE container by heat welding additional layers of HDPE preferably on the inside of the containers, in built tubes can be made, these can be reinforced with wire and preferably at least one layer of wired EPDM. The additional pressure created below a certain depth can be reduced with the piston compressor. The piston compressor can reduce the air pressure on the downward journey and store pressurised air in a pressure vessel, this can be opened to release air bank into the tubes.

Rotating Containers

In the one way and two ways system excluding horizontal cable concept the container can be fitted with the ability to rotate 180 degrees so that the container remains hydrodynamic in both directions. The rotation can be induced using water jets, compressed air, motors or electro magnets gears and counterweights.

This can be achieved using a rotatable arm joined to the container which in turn joins to an elongate member; the elongate member can then comprise joints to the cables. The rotatable arm joins the container in one place which allows the container to rotate.

Rotating container can be fitted with weighted membranes for filling and use electro magnets or hydraulic switches to enable and prohibit the valves from venting. If pressure valves are used the weighted membrane will only descend once the valves are open due to depth.

A circular disc may be placed based the container so that a wheel, may run along it to rotate the container.

Venting/Slipstream System

As the container descends it will be useful to vent the waste cold water before the container reaches the maximum depth, the nose and tail could open using sliding door, which will potentially lower the drag profile.

The entire container could be fitted with vents, and at the sea bottom where a short turning circle is preferable the vents can remain open long enough to reduce the drag by allowing water to pass through what would have been large flat poorly stream lined surfaces. These can be opened using depth triggered pressure switches which allow these flaps to lift or slide open, doubling as the filling mechanism.

Water jets can be used to induce fluid motion and or containers motion during periods of high drag this can include instances of strong currents, and could operate on the equal and opposite reaction principle using generally concealed turbines or with the use of stored electric power.

Electric pumps on platforms or suspended form the surface or held on the sea bottom or wave power pump can be used to induce motion of the sea water in key places to lower the drag on the containers.

The use of wave pumps and or hybrid wave pumps and the use of walls to prevent the fluids from interfacing with motionless fluid, will keep the motion of the fluid high.

The use of an additional cable system close to the containers which will induce fluid motion to lower the drag of the containers, the cable system will hold paddles which will induce fluid motion; the fluid motion will reduce the drag on the containers these paddles could be angled to form a fluid dynamic harvesting system incorporating a generator.

Emptying

Along the top and bottom sides of the container there will be a small section of pipe which acts as the extraction/insertion point, preferably there will be at least one of these. The pipes will not extend out of the side of the container in order to optimise streamlining, Preferably in order to empty the container the extraction system will extend at least one plug like male extension into a spring loaded flat surface, the surface will depress. The male extensions will not pass the extent of the outer streamlining; with the male fitting inside the interface pipe (s) the cold water will not be polluted.

Preferably an additional suction cup or pipe will be place over first, with the extractor male end then being inserted. Alternatively the male ends of the extractor will not contain any warm water, as the male ends will also have spring loaded flaps which will only be forced open once inside the interface pipe(s).

A Current Break

A current break is essential for preventing currents from catching the flat sides of the containers which would break the cables or for lowering the costs of strengthening the cables and for reducing the effect on the moored platform and for ease of installation, The current break can be made from HDPE tarpaulin and feature ribs for stiffness and optimal shape, preferably HDPE rigid board or metal tubes two or four V shapes to form a star or double triangle would protect the surface platforms and containers from all sides if the platform if cable system were placed within. The platform can use mooring cables to join to the tops of these current breaks if they feature cables and buoyancy at or near the surface for additional stability. The current break can use nylon or coated cables for a long service life. Alternatively the current break can be held from buoys.

Another method would be to use the buoyant cable and mooring with random objects held long its length The tarpaulin can be held without ropes and buoyancy can be stored on the sheets themselves, some holes can be made in the sheets preferably with strong eyelets. These openings can feature HDPE pipes or additional sails which divert the course of the current downward or upwards.

The use of the current break as a platform for the slipstream inducers

Alternatives with or without current break include girder rails or cables along which the containers pass these girders can be used to stabilise containers near the surface and a current emery farm, Containers can feature emergency hydraulic mechanism to close around mooring ropes, preferably nylon the system stops. Alternatively the mechanism is able to ride along these ropes. The container features loop holes with conveyer tracks, there can be more than one track per loop hold so that the container can be forced in any direction.

Potable Water Bags (or the Like) for Aquaculture

Submerged or floating potable water bags for growing plankton;

Large potable water bags can be used to hold the waste cold water for the sake of growing plankton for introduction into shrimp and mollusc enclosures which could be converted potable water bags with additional layers of canvass to create a larger surface area on the inside, the combination of the three is suitable for sustaining Red snapper and cod which can be grown in underwater cages, the inside of the current break can be turned into an offshore aquarium or netted farming station and a sanctuary on the outside.

The bags will act like fish tanks and can be supplied with air and used to mix warm and cold water to create plankton blooms. The new mixture will be cultivated and then introduced to other bags with a variety of organisms on different trophic levels.

Alternatively plants could be grown in layers on the sides of the canvass held by the cables.

Raising Water for Non-Tropical Areas

Nutrient rich water can be raised in non-tropical waters the use of the current breaks as sanctuaries and the release of the nutrient rich water could be used to restore wild fish stocks as well as farming stock.

Hoses and wave pumps can be used to spread the nutrients over a larger surface area so that the increase in nutrient is more subtle and less explosive. These areas could be illegal to farm or could be farmed under regulation.

Alternatively the use of the cold water system to replenish wild cod stocks after the plankton rich water has been released into the proximity of open ocean mussel's farms.

Production of Mussels

The use of ropes and mussels suspended from the submerged yet buoyant platform, would allow for longer lines, the use of plankton gown in the potable water bags could be used as food for mussels, Multiple Systems Leading to a Centralised Network of Heat Exchangers and Turbines The cold water form several different systems is sent to a central point, a staggered timing in the different system means that the containers can empty faster than the time it takes for the adjacent container on its own cable system to reach the extractor.

Fresnel Powered Warm Water Intake System

The use of Fresnel lenses to heat the surface water to a higher temperature, the light will focus on a pipe inside a trough which will warm the water; the warm water will pass through the trough on its way to the heat exchanger. The Fresnel intake system can be articulated so that it can bend and or/be withdrawn from the surface during periods of strong wave activity.

A Permanent Heating Coil Joined to Heat Exchangers

For use in traditional or new novel heat exchange system at least one small kettle coil is joined to the inside of the outside on the heat exchanger, the heating coil uses electricity to heat the heat exchanger to a suitably high temperature on a regular basis, this will prevent bio fouling.

A Cable System with Joined Containers;

Preferably in the case of the horizontal cable concept, although the water is held in many containers, the containers are all joined up to lower the drag profile this would work in the same way as a train, with the joining section able to contract and turn. This is for the sake of slipstream.

A Rotating Extraction System for a Horizontal Cable Concept System

This extraction system requires containers to be capable of empty as the container(s) still moving, a water tight tank with a sealed conveyer passing in the same direction as the containers, a person skilled in the trade to advice. The Conveyor conveys at least one hose/pipe with rigid male or female fitting to dock with moving container, water is extracted and/or inserted the conveyor passes around in a loop. The system feature automation technology akin to a factory process system.

Hydraulic Vents

Container flushes using hydraulic vents; vents lift with hydraulic pressure.

Hydraulic gripper.

Figure 5:
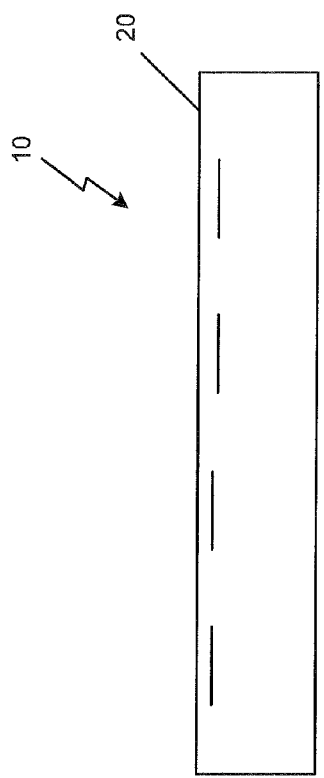
FIG. 5 is a side view of trough within a system for raising water, in accordance with a first exemplary embodiment of the present disclosure.
Figure 6:
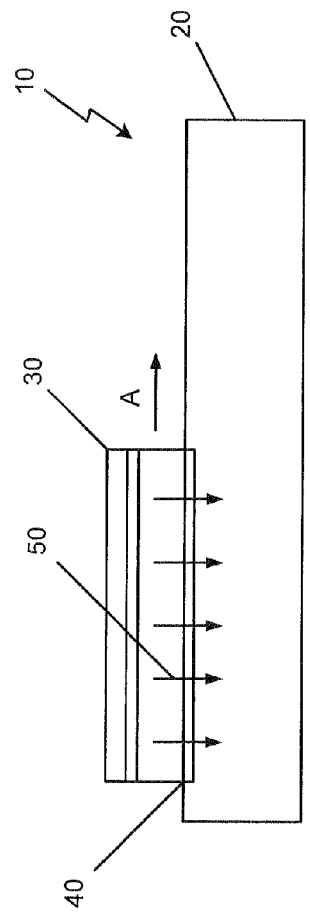
FIG. 6 is a side view of a trough and container within a system for raising water, in accordance with the first exemplary embodiment of the present disclosure.

A 'cylinder' shaped bag is placed over the cable the bag can fill and empty to create hydraulic pressure on the cable, this pressure can be released at the surface to replace the spring catch system for the sake of allowing a container to stop being pulled by the containers, and is preferably used with nylon ropes and fitted with a robber lining on the inside. A pneumatic version would use very high pressurised air chambers with pistons and could perform the same task. These bag shaped cylinders could be any length and have hydro dynamic noses. Cylinder can future replaceable rubber/plastic and metal inside to prevent damage to hydraulic bag due to moving cable Sliding Extraction System FIG. 5 is a side view of trough 20 within a system for raising water 10, in accordance with a first exemplary embodiment of the present disclosure. In order for the containers not to have to stop during extraction and so that the containers can be placed close to one another, the extraction system comprises; a trough 20 (i.e. animal water trough), as is shown in FIG. 5. FIG. 6 is a side view of a trough 20 and container 30 within a system for raising water 10, in accordance with the first exemplary embodiment of the present disclosure. As is shown in FIG. 6, the trough 20 may be above and below or to the sides of the container 30, and a seal 40 can be formed between the container 30 and the trough whilst the container 30 moving (as indicated by arrow A). The water 50 may move from the container 30 to the trough 20. The length and width of the trough is optional, long and wide, short and thin, etc.

FIGS. 7A-7B are a side views of a trough 20 within a system for raising water 10, in accordance with the first exemplary embodiment of the present disclosure. The trough 20 can use hydraulic/spring flaps 22 or other energy source to cover the extraction/insertion valve spaces during motion, these can open sideways. In FIG. 7A, the trough 20 is illustrated with the flaps 22 closed, whereas in FIG. 7B, the trough 20 has open flaps 22.

FIG. 8 is a side view of the system for raising water 10, in accordance with the first exemplary embodiment of the present disclosure. FIG. 9 is an enlarged side view of the system for raising water 10, in accordance with the first exemplary embodiment of the present disclosure. Relative to FIGS. 5-9, the container 30 moves along at the surface the trough 20 and connects to form the water tight seal 40. The trough 20 preferably has two protrusions 24 on either side (i.e. a T shape) and the container 30 has two L shaped protrusions 32 which the T protrusions 24 fit in between forming the seal 40. Once a seal 40 is made between the container 30 and the trough 20, the moveable membrane 60 in the container 30 may force water 50 into the trough 20 through valves 70 in the container 30 and through the flaps 22 (FIGS. 7A-7B) in the top of the trough 20. The lower L shaped protrusions 32 can be corrugate and use rubber or hydraulically expansible sacs 80 to create compression for a tight seal 40. These L shaped protrusions 32 can be retractable or feature a spring loaded front for hydrodynamic travel.

In another embodiment, a syringe piston casing is cut open to reveal a space in one of its sides (the trough) a second syringe casing/tube fits inside this casing with a close fit. The second tube is held from the container or vice versa. The second tube joins to the container (or vice versa), Both tubes contain at least on other cut away section with a membrane covering its length/width, this membrane is held in place by to bars because the membrane is fitted with holes, placed closely within the holes are the bars. This allows the membrane to be pushed 'up and down' the bars are fastened to the tube. Piston and chambers (sealed syringe preferably pressurised.) Or springs provide pressure on the membrane to keep it firmly placed against the tube so that a water tight seal is made until the right moment. Along the outside of both membranes a second layer of membrane with or without additional rigidity flow friction surface create a pair of raised surface which interact with cone another, this membrane is thinner than the hole/cut away section of the tubes so that fluid can pass between the two tubes. Due to the size of the two tubes when the one is placed in the other these raised surfaces will force the membrane open. The raised surfaces can feature slopes at each end. The piston and chamber can be pressurised and can be connected to either a hydraulic or pneumatic pump. One of both of the pistons can feature additional compressible membrane for a seal preferably around the nose of tail of at least one of the syringes. The membrane can feature additional bars passing from one side to the other which can be joined to previous said bars or additional ones. The inner side of both tubes contain the membrane and the outer tube is enclosed by another tube; with the exception of the open area through which the inner tube passes (inner tube joins to container or extractor system)

With the use of a weighted or buoyant membrane held with potential energy the opening of the two membranes can release the potential energy of the membrane which will force the fresh fluid (up or down depending on membrane) out and into the extractor through at least one separate pair of tubes. The inner tubes pass water through its joining section (the section which passes through the cut away section of the outer tube.) the outer joins though pipes or hoses to either the container or extraction/insertion system of the platform depending on whether the inner tube is joined to the container or the platform.

The inner side of the outer tube can feature membranes (i.e. sections of rubber) which are the opposite shape (an indentation to match the inner tube protrusions as well as a the membrane forming a seal with the inner tube itself. In effect both ends of the other tube form a consistent seal the with inner tube. These membrane can feature holes with hoses leading through the membrane and a pump which sucks through the membrane this suction forms a tighter seal with the inner tube.

The membrane sections fasten to the tube at each end. The raised section of the membrane can be pressed by either the tube or the opposite membrane. Additional membranes at each end prevent fluid loss. Check and ball valves filled with a fluid with protrusions on the balls or with balls protruding through their holes can also be used.

Rather than forcing two membranes together each raised t surface contacts a raised rigid member on the opposing surface the two tubes/surfaces features a raised surface which contacts a rigid member rather than a opposing raised surface. With this configuration both of the contacting surfaces feature indentations tin the sealing membranes at their nose and tail (and preferably along their middle), this allows the two surfaces to form a series of seals with one another.

Container in close proximity can use a flexible bag filled with fluid to join the extraction system of the two containers, the prevent fluid from passing out of the extraction system so easily.

The trough can be cylindrical as can the container tube from where the water is inserted or extracted, the top of the extractor cylinder is open allows for the container tube to pass, the container tube features hydrodynamic nose. Extractor check valves are placed on the outside of the cylinder. The container tube can be retracted.

The trough (preferably insulated) has valves/hatches which open due to motors or springs which include a computer programme or simply with the use of spring loaded valves, the trough then joins to the OTEC system through insulated pipes. With the use of a programme the trough and container system can feature a series of vents/valves so that each particular valve can open and close at the right time.

Preferably the trough is fitted with a waxing/greasing/disposable layer system so that the trough can use ski type runners to fit inside the containers grooves to create a tight yet low friction relationship alternatively the runner incorporate at least one rubber conveyer belt or along a series of tubes acting as long wheels. This system will preferably be fitted with a suspension system to create a tight fit and either one of the conveyor systems should be designed so that a minimal amount of water leaks.

This type of extraction system can be incorporated into the 'wings' of the containers, so that the water is extracted through the sides of the containers and the container comprises a vent/pipe box system so that new cold water and waste cold water can be passed in and out locally to one another with the force of the driving system creating the seal.

The Trough can be fitted with surfaces with no valves at each end.

The trough and container meeting surfaces can be corrugated with small layers of removable low friction surfaces. And membranes creating a tight seal.

The trough and container can feature; corrugations, rubber and metal parts, mechanisms for compressing the container in to the trough e.g. suspension, rails ('male and female'), the end of the trough T can be semi flexible or rigid and can utilise hydraulic 'hoses' to complete compression between the container and the trough, the hoses expand due to fluid pressure creating a tight fit. The tough can use pneumatic valves (syringe like pistons filled with air and enclosed for an elastic automatic response to pressure changes respond to pressure on a flat plate to reveal and fluid transfer interface.

The trough can feature a sump using large 'syringes' preferably with an additional syringe joined to the sump piston providing an elastic response to the trough/sump, pressure/volume variations and to facilitate a constant pressure on the water (in particular the waste water) to pass through the membrane if it is open.

Cables in a V Shape

The v shape will allow for multiple containers to be emptied slowly at one time. The top of the V will hold multiple cold water related systems.

Angled Cables for Shore Delivery

Rather than going straight up the cables move diagonally y across to a platform and then taken in pipes or hoes to shore.

Surface Platform

The use of a near neutrally buoyant extensively streamlined surface platform and or buoyancy, the platform buoyancy is held above the water, and is tethered to the sea bottom. The platform does not rise and fall due to its streamlining during storms the platform is submerged, i.e. the mooring cables prevent it from rising and the buoyancy from falling. (X) The extent of the buoyancy (vertically or horizontally) is such that even in very large swell the buoyancy modules will not sink and the mooring cable will be held tightly.

Alternatively the platform is not buoyant . . . the platform itself is not buoyant but is held on at least one separate cable, the separate cables are held upright by buoyancy modules at their tops. (Y)

Alternatively the sub surface platform uses additional cables and pulleys prevent the platform from falling. (Y)

The cable system is held from anyone of these platforms beneath the surface preferably far enough beneath the surface to be safe from waves.

A Platform which can Change Height

Alternatively the surface platform will be held in place regardless of wave height (at least capable of being held out of the ocean during peaceful conditions) as it is connected to at least one mast by a cable; the mast is supported by a modified tension leg and a pulley system is able to raise and lower the platform.

If the system uses a surface platform the surface platform will hold a streamlined; building, wherein a power from the OTEC system will be used to produce hydrogen on the platform. The platform can be held rigid using both submerged platforms and platforms using cables and pulleys and tension leg masts. It is possible that the platform can change height and that it can be raised in an out of the water and that it can be lifted to a height of a ship.

The use of a platform which uses pulleys will allow for all of the systems relevant to cold water use to be lifted from the water and serviced.

Rather than featuring several platform the service platform and submerged platforms can be engineered so that the group of systems is basically one platform A Maintenance Cable Alongside the main cable system or group of cable systems is at least secondary cable system/suspended rope, this system can joined to the containers as they pass near the surface allowing all containers to be temporarily joined to the maintenance cable system, the driving cables can then be replaced A Maintenance Platform A proposed system generally consists of buoyant yet submerged platforms but in addition there is at least one of the said masted platforms, this platform position can change so that it can lift any section of a large system to a place where the section can be serviced. For example there are 10 submerged platforms and one maintenance platform, the otec components can be transferred to this platform and raised above the surface. The maintenance platform can be held on rails so that it can move to a position adjacent to one platform or another or the components can be moved to the maintenance platform along rails with the servicing platform in one position.

Alternatively a moored suspended platform is fitted with permanent or semi-permanent preferably neutrally buoyant beam which extend upwards, the bars comprise grooves which allow a second platform with additional rails to join the moored platform rails, additional beam extends downwards from the second platform (which Is intended to hold OTEC lttd. etc. systems) at the bottom of which lies a variable buoyancy component, when the system requires servicing the buoyancy is increased and the second platform is raised above the water, the rails run along the rails and the extended bar beneath the second platform remain well below the sea surface, the system can be controlled so that the second platform height can be regulated.

Alternatively the moored platform has grooves through which bars joined to the second platform run through, but has no bars of its own, the moored platform has grooves only.

These bars can be added and removed from each platform so that only one set of rails and one set of bars with stored buoyancy at one end are used to lift a plurality of second platforms.

An additional set of rails run underneath all platforms like a train track, the rails, and the buoyant bar system runs along rails and can be fixed in the centre of each platform. A rack and pinion gear and computer controls provide automation.

Servicing Platforms

The submerged platform can make use of legs (which can be fold) these legs are capable of at least supporting the OTEC, LTTD systems during the process adding or removing them from the platform.

A Static Cable System

Figure 10B:
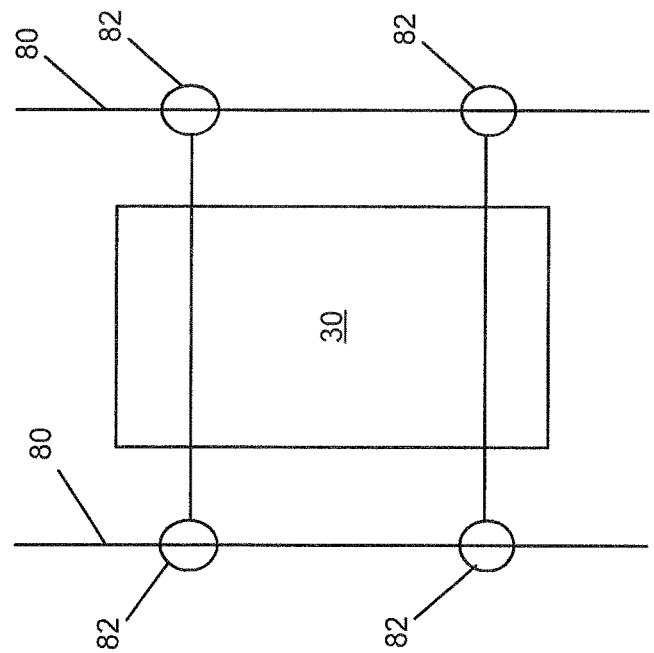
FIGS. 10A-10B are schematic illustrations of a static cable system for use with a system for raising water, in accordance with a first exemplary embodiment of the present disclosure.
Figure 10A:
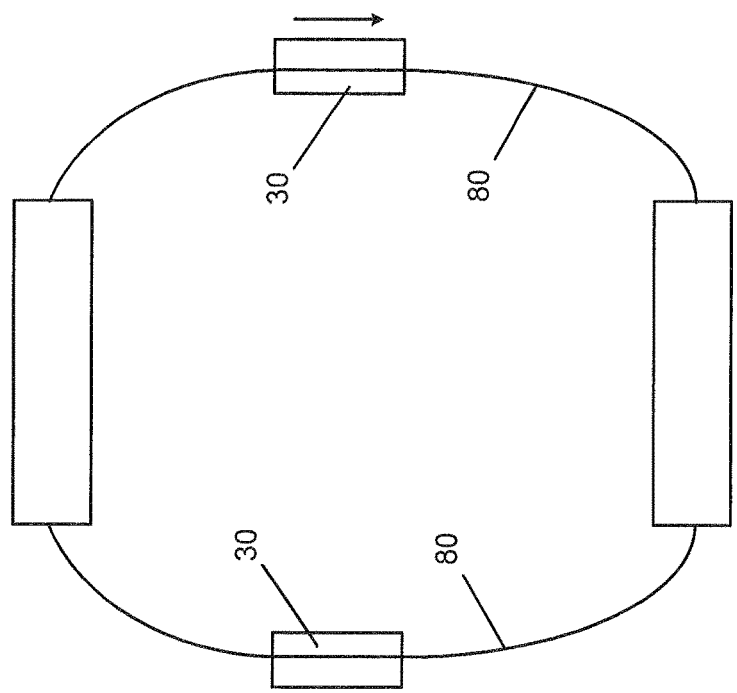

FIG. 10A-10B are schematic illustrations of a static cable system for use with a system for raising water 10, in accordance with a first exemplary embodiment of the present disclosure. This system 10 uses at least one rubber wheel 82 to drive the container 30 by pressing on the containers held in the rails at the surface and preferably along the route as well, the wheels create sufficient traction to drive the container's there may be at least one wheel above and below or to the sides of the containers 30.

Rather than gripping the cables 80 the container grippers are essentially loop holes which pass along the cable.

The containers can be joined to one another using ropes or chains.

More than one cable can be used on any side of the containers.

The container's grippers can be fitted with wheels or skis depending on which one is ultimately preferable. The grippers are capable of rotating.

The rope itself can be covered in a smooth protective coating, preferably a strong rubber or plastic.

Since the cables are ridged stronger less flexible cables can be used to make larger systems, the cables will be held onto a tower at the bottom and preferably is several other places so that they don't move.

Preferably once the ropes are in place tubes can be placed over the ropes to create smooth rails. The tubes/pipes will be carefully hinged and will use the ropes to absorb the force. The ropes can be divided but held together using chains or adapted tensioners, where the ropes are divided the tubes will be joined to the chain base of tensioner base so as not to weaken the rope.

Rather than using pipes the same split rope system will use the ropes joining section (which will probably mainly consist of solid metal) will be used to create a rail system. The grippers will then use skis or wheels to glide over the rails.

The use of additional anchoring will keep the rails or tubes semi rigid additional tensioners can be used to control the rail, tube motion.

The tensioning sections may hold buoyancy modules, or the backs of the pipes/tubes can, this will neutralised the weight of the railing system.

Belt Cable Drive

A system for driving cables comprising of at least one conveyor belt preferably 'rubber', which drives the cables or containers, preferably two belts will be use so that the two belts press into one another, This belt system may be used at the top and bottom of the cable system or at any other point along the cable way, This system can be adapted to drive containers along rails or drive cables to pull containers.

The lower belt system can be a neutral system (no motor) whereas the upper belt system will be connected to a motor and or hydraulic turbine, the belt system can be curved or straight and if a double belt is used the gripper should be able to pass. A person skilled in the trade can advise on the best system preferably featuring a suspension similar to military tank track.

The side, through which the gripper passes, is preferably fitted with bars/levers which are able to be pushed forward as the container gripper passes, the rest of the time they will serve to prevent the cable from coming loose, the lever may hold a spring and a rotatable section to minimise any cable damage.

The belt can be driven by at least one 1 rubber coated wheel driven by a motor.

Suspension Between Cable Gripper and Containers;

The joints between the container and the bars which hold the grippers are able to move so that the container can compensate for drag as the container turns a corner the tail will press into a suspension system rather than exerting force into the cables. The type of suspension used in the front of the container will differ from the suspension used in the rear.

Rather than using the cables to hold the force during turns a rail system can be incorporated into the turning sections. Either the rail will comprise a conveyer belt (at least one) for a bar between the grippers and the container to pass through or the rail will facilitate a small wheel system between the gripper and the container to pass through it, as the suspension responds to the increased drag the rail will prevent the drag from stressing the cables as the rail will absorb the additional force.

Side Wings for Off Cable, Container Propulsion;

Rather than featuring one long wing the container would comprise two small rotatable wings/bars on each side of the container with would be guided between rails and the wings would also be suitable for being driven by a conveyor belt.

The combination of suspension and guidance bars will remove the force from the cables. The guidance bars can feature a conveyor system and may or may not allow for containers at the surface to be driven by the conveyor rather than the cables.

Multiple Cables Attachments at Each Side

One joint from the container joins to at least two cables. At least one joint on each side of the container i.e. the container uses more the two cables for support.

Mix and Match

All of said innovations can be mixed into the most suitable combination including the incorporation of wave pumps.

Container Insertion Systems

A least one rails descend form above the sea surface to the underwater platform; the container gripper incorporates a spring which is forced open by the rail. The container is passed from the surface down to the platform where the rails guide the container into being level with the ropes at the same time the rails change with so that the container gripper is ready to close onto the cable.

Variations include retractable and removable rails, and rails with only guide the container without grippers, the gripper are added once the container is in position.

This rail concept can be used for maintenance including the replacement of the cables containers pass only horizontally placed rails which curves down ward so that the containers can join a vertical rope (s). This maintenance rope can be joined to the current break system.

Roof Inlet/Outlet System

The horizontal cable concepts feature an angled roof (like a house) with two layers in the middle waste warm water of fresh warm water is passed through depending on the design. Nets, wave pumps can be incorporated. Water can be sucked in from the sides or from the top or forced out through the sides and or top. The roof could incorporate Fresnel lenses to warm the waste water or the fresh warm water.

If contamination is a problem preferably the OTEC heat exchangers will operate on one side of the platform with the waste warm water being drawn through the roof.

The roof can be designed to capture the moving water generated by the moving containers.

Layout

The OTEC turbines can be placed on the roof angle an additional with an additional layer to the roof the condensers also held in the roof angle with the evaporators to the side or also held on the roof.

Two layers of tarpaulin preferably filled with sand can be used as a discharge hose for the waste warm water this hose could be rendered neutrally buoyant.

Insulated Syringe like pumps can acts as sumps with neutrally buoyant parts

Preheating pipe can be placed at the sides or on the roof.

Imitation System

A system featuring a cable system and at least one offshore platform; the container is brought to close to the sea surface, where extensions from the platform join with the container preferably under the water, cold water is passed up and waste cold water passed into the container. OTEC heat exchangers held on the surface platform. There is no sub-surface platform. The system features a plurality of surface platforms.

Alternatively a boom extends between a plurality of platforms, the boom features extensions to interact with the containers or submerged platform under the surface, water is transported to ships or platforms along its length containing heat exchange systems, alternatively the boom holds heat exchange system and turbines if OTEC system.

The platform can feature at least one boom which can be joined to at least one other platform; these booms can hold the protrusions for cold water retrieval. Two containers pass up and down and the cold water is drawn from the containers into the boom, there can be more than one group of two way containers for each boom. The booms can hold the driving system or container support/guidance system.

One of more platforms can extract and insert water from one container, it is envisaged that there would be several platforms using very long containers.

At least one platform can send water or energy to at least one ship. The ships moor with the boom or platform.

Container Filling One Way

Static sliding extraction;

A Container reaches surface, container slides into extractor and detaches from cables, preferably additional rails and supporting conveyer support container.

The extractor features pneumatic or hydraulic pistons on its inside which force a membrane on the outer side (contrary to other sliding filling system) of the extractor down exerting pressure on the container membrane. This forces the container membrane in (container membrane is held by springs from its inside). Once depressed a sealed opening between the two containers is created. The extractor membrane is pressed to a point within the container extractor To the sides of the extraction membrane and on the container, notches (T extraction and L notches on container) create a seal between the extractor and the container. These must be designed to make a tight fit. The height of width of the two notches can vary, so that entrance is easier. These notches can be made from MDPE or HDPE rigid plastic with an additional layer of rubber for a compressible seal.

The sides of the extractor and the ends can feature pumps to create suction between the container and the extractor. Should this system suck in water it can be directed to a waste sump?

To the ends of both the extractor and the container flat surfaces with no membrane but with the T and L design prevent excessive water loss. These areas can feature suction pumps to create a tight seal and a mixture of rubber and metal for tight seals and low friction surfaces.

The surface of the two faces of the extraction system can feature compressible rubber section with varying elevation, and removable metal strips for low friction interface.

This system should be fitted with sensors and a computer programme to activate the extractor pistons and the container velocity.

Once emptied the container will be sped up by the conveyor and will re-join the cables.

Dynamic Sliding Extraction;

This sliding filling system uses the same membrane as above (Static sliding extraction);

The system is nearly identical except that the container is not derailed and the container is emptied in motion, to the ends of both the extractor and the container flat surfaces with no membrane but with the T and L design prevent excessive water loss. These areas can feature suction pumps to create a tight seal and a mixture of rubber and metal for tight seals and low friction surfaces.

The container membrane uses springs, the extractor pneumatic or hydraulic pistons (and springs). When the membrane on the container is not pressed by the extractor membrane the springs force the membrane closed.

The two membranes are placed flush with the sides and ends in their locality; the container membrane can act as the filling opening and can be forced sucked inward by a buoyant, weighted, or motorised membrane. The container can feature a plurality of these membranes.

Vents and Springs

Vents forced open by the membrane are held on springs, these vents will allow water to pass in and out of the container. The valves will preferably only let water into the container on one side and out on the other, these valves will operate as one way valves and can feature and grid or gauze to prevent organisms from entering.

Container Design

Two layers of hdpe geo membrane with a layer of Poly urethane foam, geo membrane is held rigid by bars or cables. The above extraction and venting system is included into the first layer and 'covered' by the second. The vents then have a lower profile than the outer layer of geo membrane. Openings in the second geo membrane like drains in a wall allow the vents to vent preferably with angle sides to improve efficiency. Although the container uses a membrane the membrane does not move to empty instead it uses the moving membrane system.

A series of containers can be joined horizontally to single supporting system which joins to at least one rope.

Wave Pumps

A Description of several wave pump which can be used to store electricity or for useful work in the above description the combination of OTEC and wave power as the locations match, with the use of the platform design will be very economical and useful, for example the wave pump can be used to spread the waste cold water from an OTEC system and introduce new quantities of warm surface water. These inventions can be used on their own in right in temperate etc. climates.

Brine Gravity

Brine held in container can pull cables connected to a generator to generate electricity, The brine can use a sliding filling and any other useful system (as otec above) to release brine into a container at the bottom ('lower container') of its fall, it can then be pumped back to the surface using a wave pump.

Diffusion System

The brine held in the 'lower container' could also be mixed with a long hose like bag which extends to the surface, the bag would contain brine of a lower differing concentration consequently diffusion will occur lower concentration of brine will exist in the upper region. Over a repeated process the hoses will gain in concentration until a quantity at the surface can be mixed with an external source of concentrated brine and or salt to create a fully concentrated batch. The hose can feature additional series of hoses within the outer hose and along its outside which allow for the brine to be passed to a range of heights and from above and below before being released into the main hoses (hoses can be likened to a series of interconnected bags with hoses inside) to mix. Wave pumps can be used to drive the fluids or the system will run as a parasitic system limited to X amount of pumping. The hose will agitate the brine due to sea movements at the surface. The hose can be split into sections to lower its head these sections can open at different times each section can store buoyancy. The brine once diffused can pass into at least one more additional container which is joined an additional hose system. The hose will be split into sections each section will feature its own buoyancy and a valve/vent which preferably opens sideways so that it lifts the brine as little as possible this vent can be open using cables and pulleys from the surface. Inner hoses can feature check valves and an electro magnet system to control a multiple valve system.

A movable membrane in each container can change the contents of the container as with the otec containers above, however the membrane will pass over a pipe joined to a hose leading back to the surface. The last container in the lower container system will force brine into this pipe which leads back to the surface in a hose within the outer brine hoses. The membrane (preferably slightly buoyant but not enough to resist the input of brine with containers at sloped angle) can move back within the container having been forced in one direction, by opening areas in its surface or by passing the fluid through interconnecting pipes or hoses which pass around the sides of the container with check valves. Buoyancy connected to a cable can move a piston joined to the containers. Brine can be passed down from the surface through hoses. Salt or concentrated brine from external sources can be added to the brine at the surface which is collected in additional containers at the surface, Container at top and bottom can be angled (one lower than the other) to create head between them and can feature a moving membrane as OTEC. Hose leading from the bottom can pass the brine (brine pushed by membrane not brine in outer hose system) into the least concentrated container. The moving membranes at the surface will pass the most concentrated brine into a final container which will interface with external brine/salt source and the cable system. This cable system can use any of above and below mentioned systems described in the OTEC section including the spinning blade below for stirring.

Solar Boiler

Due to the lowered mass of the brine due to the diffusion system, relative mass difference this process can be used to reduce the no of wave pumps used in a low wave region. Fresnel lenses held in troughs can be used to boil sea water the focused sunlight can pass through two sheets of glass onto a pipe the pipe boils the water, the two sheets of glass held slightly apart are used to form a vacuum allow the steam to pass into a pipe where it will stimulate a Stirling engine heat exchange surface, sea water (preferably cold deep water) can be used to cool the steam/Stirling engine (cold side). This process can take place at sea or on land and will form brine; the brine can be used in the above mentioned systems. if the brine system is deep enough and in the right region in can deliver cold OTEC water and produce brine using its evaporator. The condensed steam can be used as potable water. Solar boiler can boil brine waste from desalination plants.

Fossil fuel power stations can be used to desalinate/produce brine using cogeneration the brine waste can be used in either the wave power or wave power and diffusion system to generate additional electricity.

Wave Powered Pumps

Wave powered pumps are known to be simple and cost effective means of using wave power, the pump consists of a syringe like piston pump at the sea bottom or with the 'syringe' held on a platform a cable (elongate flexible member) is attached to the piston and to the buoyancy.

The buoyancy preferably comprises a fully sealed air lift bag, a cage, and an attachment point to the cable. The buoyancy is either held freely within the cage or the bag is joined to the cage bars. The cage comprises at least two circular rings, at least two curved metal bars and a flexible joint to join to a tensioner or the cable. Bar can be coated in rubber to prevent damage to vessels.

At least one part of the system is weighted preferably the piston itself, or an area above or below, if below the shaft must pass through the bottom of the housing.

Preferably the piston shaft will pass through a balancing section in at least one place comprising a circular ring through which the piston can pass, with the ring grounded into the cylinder and the cylinder grounded onto the sea bottom or onto a platform.

Preferably the piston housing is longer than the highest waves recorded in the area, for example assuming that a 10 m swell is 5 m higher and 5 meters lower than the sea surface on calm day the piston housing will be at least 10 m high and the membrane on the piston will rest on a flat day in the middle of the 10 m cylinder.

The buoyancy may be held on a device which is similar to a pump jack or simply held on the end of a cable.

The wave pump can use a closed cycle concept so that it does not take in sea water; this can be the case if it uses onshore cliffs with pelt ram turbines or if it drives the fluid horizontally or vertically at sea. Preferably the system will be hermetically sealed it all parts of the system. Preferably the internal system will be de aerated using the most suitable known method.

The use of a dense liquid can reduce the size of the chambers and pipes within the system, such liquids include but are not limited to Iodine Brine or Bromine, solutions mixed with distilled water can be made and can include solutions of cigarette waste which are known to prevent rusting and corrosion. Bromine and iodine solutions will also prevent bio fouling but they are very corrosive.

The external cylinder can be coated in plastic or a layer of water tight canvass, preferably with a corrosion inhibitor inside, alternatively the system can be made from concrete.

The pump can be used to mix fluids, raise fluids, and drive hydraulic turbines to generate useful work or electricity, these systems can be closed so that they do not introduce aerated water or salt water into the system.

The wave pump can be used to compress air for use in the above otec system pumps.

Flat Liquid Closed Cycle System

Using a dense liquid and or non-corrosive/less corrosive liquid to drive hydraulic turbines, The use of a dense liquid should lower the size of the turbines pipes and pistons required.

Depending of the type of pump the closed cycle system will require a second expandable container i.e. a bag or syringe.

The fluid is driven by pumps in a loop, the system is not exposed to sea water and corrosion inhibitors can be used inside.

Preferably Teflon pipes with a steel exterior will be used so that iodine and bromine can be used.

Since iodine and bromine is corrosive, concrete pipes are potentially preferable, mixtures including concrete exterior and glass interior, de aeration and hermetic sealing preferable.

The use of a closed cycle can include systems which use an elevated position to create potential energy.

The piping should be designed to allow good fluid motion the loop can pass back from the generator, above or below or around the sides.

Double Chambered Wave Powered Piston Pump

A double syringe system consists of a cylinder with a membrane enclosed within the cylinder, the membrane holds two pistons at each end, both of which extend from the membrane, one up and one down, the weight is held by the piston membrane interface (the flat part of a piston which is used for compressing the fluid) or above or below with the weight preferably streamlined. The chamber must be made to allow the shaft to pass up and down but for little or no fluid to escape.

The rope leading to the buoyancy is joined to the upper piston (shaft).

This creates a cylinder with two chambers each chamber is fitted with an inlet and outlet check valve more than one of each can be used, like a testicle there may be many. At any given moment when there are waves both of the chambers, is either filling or emptying consequently the one cylinder can create a near constant supply of fluid.

This concept may incorporate any one or some or all of the previous or following inventive features.

If this pump system features a closed cycle system the piping system from the piston will not require a contractible section other than the piston pump.

Additional pipes which a fixed from a point in the pipe prior to the inlet check valves around the piston housing and into the pipes after the outlet, prevent the system from jerking. By allowing pipes to allow fluid in motion to pass the around piston the hydraulic turbine will not seize up at any point, this will also help the turbine to conserve momentum as fluid will continue to be able to move at top point and bottom point of the piston movement.

Submerged Platform

A platform held under the water consists of a least one rigid member, the platform has stored buoyancy which creates uplift and the platform is tethered to the sea bottom so that the platform does not lift to the surface. The platform is placed sufficiently under the surface waves so that it is unaffected by them, the platform can be used to hold the cables which hold the buoyancy and can hold the piston pump and hydraulic turbine, the platform can be used to hold the closed cycle systems, and storage tanks as well.

The buoyancy will then rise up and down at the surface and the cable will transmit the motion of the buoyancy to the piston pump, the piston pump will be at a safe distance beneath the waves as will the remaining system whether that is a hydraulic turbine closed cycle system or pipes. A plurality of platform can lead to/from shore and power cables or pipe can be placed along them.

The air lift bag buoyancy can be sunk in very extreme weather by releasing the air, a compressed air tank or one large compressor can re-inflate the bags, preferably the bags will be permanently connected to the source of compressed air.

Piston Membrane

Resin, rather than rubber or even just metal or plastic can make up the component of the piston i.e. the piston does not need to consist of a rubber membrane to prevent leakage.

Check Valve Design.

An optional design for the check valve; the check valve can be made using a small flat plate which is electronically powered or the plates motion is caused by the motion of the piston itself. The plate opens and closes sideways and is triggered using trip switches or the plate's motion is caused by the motion of the piston itself. One plate will open as the other closes. Power for the motor can come from a small alternator connected to the piston of from the power produced by the main generator.

The motion of the plates will coincide with the motion of the piston. This will prevent water from flowing into the check valve as it is sucked or pushed.

The plate can be driven using a motor rack and pinion gear or the motion of the piston and a rack and pinion gear.

Optionally Small check valves connected to the in and out sections are joined to the piping system; the strokes of the piston trigger the opening and closing of these check valves which trigger the electronically powered sliding valves by tripping switches.

Rack and Pinion Gears on Cylinder

To adjust the height of cylinder midpoint relative to the submerged platform, this will allow for slack in case of very high waves and exact heights in case of tides.

A Piston Pump

A wave powered pump with no arm, with a single piston moved by the wave motion due to buoyancy at the sea surface, lifting the piston up when the wave rises and falling down when there is no wave the piston draws fluid past a check valve from the bottom containers on the up stroke and presses it passes it into the delivery line the delivery line holds a check valve stop water being sucked back during the up stroke.

Cable Piston

Rather than using a rigid shaft a cable is used with the piston head acting as a driving weight held in housing and lifted from the surface by the wave motion. The piston forms a seal and behind it is held a heavy weight made from metal (like a syringe but with weight in the piston to perform a down stroke). The length of the cable can be adjusted to compensate of the change in wave weight. This will suit deep water applications where long rigid poles would be vulnerable. This design can be used to pump water through hoses from lower regions to the surface, this will be useful in ocean thermal energy conversion where the use of a hose would lower cost and improve feasibility.

Variable Rope Length and Piston Housing Elevation

An adjustable piston housing at the bottom so that it can change in height with allow for a complete change in the length of pumping cable so that in large swells the cable is lengthened and the housing lowered. With the length of the piston and its housing designed for large wave so that the system can pump larger volumes in large swells. This will allow for the system to restore itself fully during large swell periods after a low swell period when it has used most or all of its reserve. This adjustable height can be achieved by placing the piston housing on a rail moving it lower than the lower brine containers during large swells and raising it to an equal height during low swells.

Locating the system on or near shallow gradient would be ideal for this concept so that the adjustable housing can be held on the sea bottom and change height.

The point of this is to get the most from all waves and to prevent the piston from destroying the piston housing in very large waves.

Since large wave periods are predictable there is even the possibility of changing the amount of weight on the piston by using a robot to or machine arm to add and remove weight.

Wave Pump in Reverse

In order to reduce the cost of the cables for the wave pump the wave pump piston housing is held closer to the surface and the piston draw the fluid held in the hoses form the up stroke from the sea bottom rather than driving the fluid up with the down stroke of the pump the fluid is sucked up from the up stroke. The platform must provide sufficient grounding for the pump to work properly.

A Hydraulic Turbine and Positive Displacement Pump—to Operate Under the Sea Surface without Motors for Use where Motorized Pumps are Unproven.

This concept consists of two non-motorized pumps (preferably a hydraulic turbine joined to a centrifugal pump through a shaft) at the sea bottom the piston pump located at the surface drives fluid down a hose to the sea bottom where it drives the hydraulic turbine which drives a second through a rotatable shaft the second pump sucks the dense liquid from the sea bottom container, this allows for short cable length between the buoyancy and the piston and the use of hoses rather than pipes as the piston would force the hose shut unless it was reinforce which would increase the cost. This concept can also be used to deliver cold water through a hose for use in OTEC to the surface.

Surface Support

The pump can be held on at least one buoyant support including a barge or even a boat with the wave system next to it, the floating support is anchored to the sea bottom. An arm extending from or between the buoyant supports holds many pumps gravity systems and containers. The use of tethers will keep the surface structure in place; the arm will prevent the buoyancy from being pulled away from its optimal angle at the surface, elasticated rope can allow for the buoyancy to move back into place, or the buoyancy is held on a rigid pole which passes through a tube, the pole connects to the rope. E.g. the pole is twice the length of the tube and four times greater than the maximum wave height thus the pole is always held firmly within the tube, the tube can be fitted with bearing so that the pole glides through the tube.

The height of the tube can be adjusted so the top of the tube lies just beneath the maximum low wave point, this will allow for the largest upward and downward movement possible.

Barge Buoyancy

For an ultra large system a barge will be used as the surface buoyancy the barges can potentially lift thousands of tons and its buoyancy can be complemented with the use of additional buoyancy for example fully sealed air lift bags the barge is joined by cables and tensioners to a very large set of piston pumps and the rest of the system operates in the same way.

Mooring/Support Structure

The pump can be held on a buoyant support including a barge or even a boat with the wave system next to it, the floating support is anchored to the sea bottom so that it is unaffected by the changes in wave height. An arm extending from or between the buoyancy supports holds many pumps gravity systems and containers.

A large no of pumps and gravity systems can be held on a rigid structure built from the sea bottom the structure can have pipes with the piston inside to improve the durability of the system or use cables with weight at the piston end.

The entire system can be held in place using bags filled with brine these bags may not be emptied although if they are joined to the reserve bags at the bottom all of the bottom bags will provide plenty of weight, the bag used to hold the system down can be fitted with a cage so that the mooring cables to not damage the bag, the bag will be easy to lower empty and then filled with brine to make an anchor this method can be used to hold the bottom wheel of the gravity system as well as the pumping system.

Rotating Buoyancy

If the air fully sealed air lift bag is cylindrical, in order to compensate for changes in wave direction so that its full length is exposed unilaterally to the oncoming wave the bag can rotate 180 degrees.

Release of Brine

During very low wave periods brine can be imported from any brine source such as an evaporation pond and some of the brine released into the sea. This will allow the system to have the potential to always operate at peak time and to be replenished without pumping if there have been extensive periods of low wave energy.

Hydraulic Turbine

If the wave system has fully restored the potential energy of the working fluid (in the case of the brine gravity system), and the waves at the surface at still moving fast so that the wave pumps are producing an excessive amount of work, the piston housing will be able to draw in sea water rather than the working fluid and drive it through a hydraulic turbine in order to generate electricity. When the gravity system requires maintenance or the hosing changed, the system will be able to continue to generate electricity through the hydraulic turbines. A plurality of pumps can drive a fluid along hoses or pipes to a single hydraulic turbine.

The turbine can be connected to a generator or wheel.

Hydroelectricity

Raising a fluid to a height using a pump, creating potential energy and allowing the fluid to fall to generate electricity or useful work Land Based Brine Reserves Rather than placing the reserves at sea the brine will be pumped back to shore and stored in a pond or tank, the pond can be connected to a brine source as well so that the system can be open or closed by releasing brine into the sea during low wave periods and replenishing the pond from an external brine source.

Wind Powered Pump

Upside Down Piston

A piston pump where the piton is grounded and the casing is weighted, the cable pulls the piston housing up rather than the piston so that the liquid inside is forcing directly upwards (as the housing end is where the liquid come out).

Holding the Buoyancy in Place

The buoyancy can be held in place using a retractable series of poles like a car Ariel the buoyancy lifts the Arial up and the aerial holds the buoyancy in place, Alternatively at least one adjustable arm which consists of two members one which slides within and is held by the other, with one member attached to the buoyancy and the other grounded either on a submerged platform or on the sea bed.

Two Hydraulic Turbines

The use of two hydraulic turbines one which is sucked into motion by the up stroke and one which is driven by the down stroke;

Multiple Turbines

The use of more than one turbine with a different power rating would mean that turbine would not be pushed passed their optimal operational speeds by adding and removing the flow of liquid from a certain no of turbines, this could be achieved by using doors so that the flow of liquid to a particular turbine could be turned on and off.

Multiple Piston Pumps and Buoyancy Per Turbine

Several piston pumps will drive the fluid through one or two turbines to make a consistent flow of water due to the spacing between the pumps.

Movable Pumps

At least two pumps drive fluid through a pipe through the same turbine, the position of the wave pumps can be altered relative to one another and the period of the wave so that depending on the period of the waves the pump are close or far apart, thus an even flow of liquid through the turbine is created.

A pipe can be created so that it is extensible like an car Ariel this will allow for the pump to change its relative position.

Twowmey Effect Symbiosis

Cables placed between two submerged platforms hold a 'sledge'

The subsurface platforms can be joined in a looped system so that the winch and cables can be removed and the sledge will propel itself in a loop. The subsurface platform holds additional wave pumps or blades for the generation of revenue.

The sledge holds a 'snorkel' which passes from under the sea to a point above sea level, the hose passes through the snorkel. On top of the snorkel is placed a spaying system which will generate cloud condensation nuclei. A fixed wave powered piston pump is used to drive sea water through the hose into this spraying system.

The point of the moving sledge is to allow for the droplet generator to change position, joining the droplet generator with the wave pump will spread the cost of the installation of the droplet generator and the overall system will generate an income.

Twomey effect can also use OTEC or wave powered electricity to drive the atomizers.

The snorkel system could run on cables around the OTEC or wave farms using power from either one to drive the cable the cables can be fitted with a turbines to generate electricity for the droplet generator.

OTEC Wave Pump

A wave pump which uses the double pump concept or the long cable concept could be used to drive Coldwater up from −1000 m (approx.) through a hose, to the surface; cold water would be pumped from the bottom so that a hose could be used.

In addition the fluid can be used to drive a turbine which drives a wheel rather than a generator or used to generate electricity in the locality of an otec system for the sake of reducing parasitic energy consumption.

This wave pump can be used to pump water for use in OTEC up though a hose.

Wave Pumps for Aqua Culture and Enriching the Oceans without Farming.

Wave pumps can be used for aerating water, removing detritus. They could also be used in areas where overfishing has harmed fish stock to bring up nutrient rich water, so as to enrich the food chain.

Cable System otec/lttd/Air Con

A new otec cold water delivery system using cables and containers exists, the cable system has a drive wheel which could be driven by a hybrid wave pump which drives a hydraulic turbine or is driven by an arm and motor pulling the wave pump cable up and down.

Waste warm water, can be dispersed with a wave pump through at least one hose or pipe.

Waste cold water can be discharge with a wave pump and/or mixed with the surrounding sea water at the discharged end using a wave pump with a hybrid motor/wave energy design.

The wave pump can be used to create a slipstream at any point along the journey of the OTEC containers.

A Spinning Pump or Electricity Generator

At least one blade with flat ends facing to the sea bottom and sky (like helicopter) with a streamlined body is attached to a cable; the cable is weighted down at the bottom and joined to buoyancy at the surface. The lower weight is able to move freely and can be the weight of the piston pump. (Piston pump used for desalination/erasing mixed temperatures for OTEC sake/saline concentrations and the rotor system used for electricity production) As the wave lifts the drag force on the flat side of the blades induce rotation, as the wave falls the weight of the lower weighted section pulls the blade down inducing/continuing rotation. This rotation is used to generate useful work in the form of a driven fluid by using the rotation to drive a pump or turned directly into electricity with the use of a generator attached to the cables and driven by the rotating shaft.

If this concept is used to drive a fluid the pump must be held to the cable and joined to the rotating shaft.

By alternating the front end of the blades (nose and tail of streamlined body blades facing in opposite directions) on opposing sides of the rotation center the blades will rotate in the same direction regardless of up or downward movement.

Since this device also depends on a weighted tail it can be weighted down by the weighted piston, relative to the buoyancy at the surface the use of both this product and the wave powered piston pump can help to lower the size of the piston pump.

The blade or cable zone can be supported by a frame joined to the rotor section which moves against and is held by a rigid support for example the submerged platform.

Electricity can be exported through a flexible electricity cable or the electricity cable charges a metal sheet which it moves up and down against this sheet which is joined to the rigid supporting frame is stroked by the up and down movement and the sheet is covered by the moving frame using rubber or plastic covers so that the metal strip is not exposed to the sea.

The blade system is placed sufficiently beneath the sea surface for there to be a significant difference between the wave height at the surface and the wave height through which the blade is moving.

The wave powered piston pump and spinning blade can operate on the same cable one spinning blade generating electricity, the wave pump pumping water for use in desalination etc.

Anti-Snag Bars

Hollow anti-snag bars filled) with gasoline or any other buoyant liquid lower performance but prevent the metal rope from kinking.

Hydraulic Turbine and Hybrid Motor Arm

The wave pump drives fluid through the hydraulic turbine which turns a shaft which drives the pumps within an OTEC system either the OTEC system or a battery drives a motor which drives an arm which keeps the pumps in motion.

Buoyancy

Buoyancy comprising a fully sealed air lift bag, on each side and throughout the length of the bag, circular rings and placed around the bag and are joined bars, the rings at either side of the buoyancy have physical extensions which move to the Centre of the ring, from this point a hinge is formed on either side with a bar. This hinge allows the cylinder to revolve.

The bars extend down ward and are then joined by a horizontal bar; either the hinge or the horizontal bar is fitted with 'suspension'.

The horizontal bar joins the cables.

The joint between the buoyancy section and the piston can be a rope (nylon or metal) or a series of hinged bars made of any suitable material.

The horizontal bar can join to at least one rope, the buoyancy will rise to the mean height and so both pistons can use the one buoyancy, this may improve stability.

Otec and Wave System Charge Batteries

The use of batteries to store electricity for sale at peak time.

The Use of the Piston Pump to Compress Air for Use in an otec System;

The piston pump will compress air by drawing it through a snorkel and compress it into tank preferably on the submerged platform.

The Use of the Wave and OTEC System for Use in Supplying Energy and Water to Oil Rigs Offshore;

Hybrid Heat Exchanger Wave Pumps

Wave pumps used to circulate working fluids in a heat exchanger.

Multiple Piston Pumps and Vent Pipes in Single Chamber Piston Pump.

The pump pipe and turbine generator features additional pipes surrounding the pump so that fluid remains in motion, more than one pump can then operate within the closed loop and the fluid will not get jammed.

Heating Elements

Heating element placed on metal surface can be used to prevent bio fouling.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. An apparatus for raising water, the apparatus comprising:
    at least one container movable between at least a descended position and a ascended position within a body of water;
    a non-water-permeable membrane positioned within the at least one container, wherein the membrane is movable within an interior compartment of the at least one container to separate the interior compartment into at least a first and a second portion;
    at least one vent structure within a wall of the at least one container, wherein movement of the membrane controls a flow of water through the at least one vent structure and into at least one of the first and second portions;
    a trough positioned proximate to a surface of the body of water, wherein the at least one container is movably engagable to an angled protrusion of the trough, wherein a quantity of water within the at least one container is expelled from the at least one container into the trough while the at least one container moves past the trough; and
    a seal formed from an expandable sack and positioned between the at least one container and the angled protrusion of the trough.

2. The apparatus for raising water of claim 1, wherein the membrane further comprises an ethylene propylene diene monomer rubber.

3. The apparatus for raising water of claim 1, wherein the at least one vent structure further comprises at least two valves, wherein a first valve of the at least two valves is positioned in communication with the first portion of the interior compartment, and a second valve of the at least two valves is positioned in communication with the second portion of the interior compartment.

4. The apparatus for raising water of claim 1, further comprising at least one piston in contact with the membrane, wherein a movement of the at least one piston moves the membrane within the interior compartment.

5. The apparatus for raising water of claim 1, wherein the at least one container is movable between the descended position and the ascended position within the body of water along a continuous loop between the descended and ascended positions, wherein the at least one container is attached to at least one loop of a cable, wherein the at least one container travels in a single direction.

6. A system for continuous raising of water, the system comprising:
- at least one container movable between at least a descended position and a ascended position within a body of water;
- a non-water-permeable membrane positioned within the at least one container, wherein the membrane is movable within an interior compartment of the at least one container;
- at least one trough proximate to a surface of the body of water, wherein the at least one container is movably engagable with the at least one trough while the at least one container moves past the at least one trough; and
- a seal positioned between the at least one container and the at least one trough when the at least one container movably engages with the at least one trough while the at least one container moves past the at least one trough, wherein the non-water-permeable membrane moves a quantity of water from the at least one container to the at least one trough when the at least one container engages with the at least one trough.

7. The system for continuous raising of water of claim 6, further comprising at least one vent structure within a wall of the at least one container, wherein quantity of water is moved through the at least one vent structure.

8. The system for continuous raising of water of claim 6, wherein the seal further comprises at least two T-shaped protrusions on the at least one trough which engage with at least two L-shaped protrusions on the at least one container.

9. The system for continuous raising of water of claim 8, wherein the at least two T-shaped protrusions slidable engage with the at least two L-shaped protrusions.

10. The system for continuous raising of water of claim 6, wherein the seal further comprises a hydraulic expandable sack.

11. The system for continuous raising of water of claim 6, further comprising a plurality of openable hatches positioned on the at least one trough.

12. The system for continuous raising of water of claim 6, further comprising at least one piston in contact with the non-water-permeable membrane and controlling a movement of the non-water-permeable membrane.

13. The system for continuous raising of water of claim 6, wherein the seal formed between the at least one container and the at least one trough when the at least one container engages with the at least one trough using a dynamic seal, wherein the non-water-permeable membrane moves a quantity of water from the at least one container to the at least one trough when the at least one container engages with the at least one trough and during a continuous motion of the at least one container relative to the at least one trough.

14. A method of continuously rising water, the method comprising the steps of:
- providing at least one container movable between at least a descended position and a ascended position within a body of water;
- temporarily engaging the at least one container with at least one trough proximate to a surface of the body of water;
- sealing the temporary engagement with a seal positioned between the at least one container and the at least one trough;
- transferring a quantity of water from the at least one container to the at least one trough using a non-water-permeable membrane positioned within the at least one container, whereby the membrane is forced to move within an interior compartment of the at least one container thereby forcing the quantity of water into the at least one trough; and
- continuously moving the at least one container relative to the at least one trough while transferring the quantity of water.

15. The method of claim 14, wherein sealing the temporary engagement further comprises at least two T-shaped protrusions on the at least one trough which engage with at least two L-shaped protrusions on the at least one container.

* * * * *